US012262271B2

(12) United States Patent
Purkayastha et al.

(10) Patent No.: US 12,262,271 B2
(45) Date of Patent: Mar. 25, 2025

(54) SIGNALING ASPECTS OF A CONDITIONAL PRIMARY SECONDARY CELL CHANGE PROCEDURE IN MULTI-RADIO ACCESS TECHNOLOGY DUAL CONNECTIVITY

(71) Applicant: QUALCOMM Incorporated, San Diego, CA (US)

(72) Inventors: Punyaslok Purkayastha, San Diego, CA (US); Ravi Agarwal, San Diego, CA (US); Gavin Bernard Horn, La Jolla, CA (US); Ozcan Ozturk, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/224,785

(22) Filed: Apr. 7, 2021

(65) Prior Publication Data
US 2021/0352543 A1 Nov. 11, 2021

Related U.S. Application Data
(60) Provisional application No. 63/022,081, filed on May 8, 2020.

(51) Int. Cl.
H04W 36/00 (2009.01)
H04W 36/08 (2009.01)
(Continued)

(52) U.S. Cl.
CPC ....... H04W 36/08 (2013.01); H04W 36/0058 (2018.08); H04W 36/00698 (2023.05);
(Continued)

(58) Field of Classification Search
CPC .......... H04W 36/00837; H04W 76/11; H04W 76/36; H04W 36/0058; H04W 36/08;
(Continued)

(56) References Cited

U.S. PATENT DOCUMENTS

2020/0267789 A1* 8/2020 Tsai ................ H04L 5/0055
2020/0389823 A1* 12/2020 Xu ................ H04W 36/0061
(Continued)

FOREIGN PATENT DOCUMENTS

CN 109548095 A 3/2019
CN 112352451 A * 2/2021 ............ H04W 12/03
(Continued)

OTHER PUBLICATIONS

Catt: "Draft stage-2 CR for Conditional PSCell Addition/Change", 3GPP Draft, 3GPP TSG-RAN2 Meeting #108, R2-1915985, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817540, 36 Pages, Retrieved from the Internet: URL: https://ftp.3gpp.org/tsg_ran/WG2_RL2/TSGR2_108/Docs/R2-1915985.zip. R2-1915985.docx [Retrieved on Nov. 8, 2019].
(Continued)

Primary Examiner — Kashif Siddiqui
(74) Attorney, Agent, or Firm — Harrity & Harrity, LLP

(57) ABSTRACT

Various aspects of the present disclosure generally relate to wireless communication. In some aspects, a master node (MN) may receive a message indicating that a user equipment (UE) has determined that a condition for a conditional primary secondary cell (PSCell) change has been satisfied for a candidate target PSCell. The candidate target PSCell may be one of a set of candidate target PSCells associated with the UE in a conditional PSCell change configuration
(Continued)

provided by a base station. The MN may transmit, to a source secondary node, a confirmation message associated with the conditional PSCell change. Numerous other aspects are provided.

30 Claims, 17 Drawing Sheets

(51) Int. Cl.
  *H04W 36/36* (2009.01)
  *H04W 76/11* (2018.01)
  *H04W 76/36* (2018.01)

(52) U.S. Cl.
  CPC ... *H04W 36/00838* (2023.05); *H04W 36/362* (2023.05); *H04W 76/11* (2018.02); *H04W 76/36* (2018.02)

(58) Field of Classification Search
  CPC ..... H04W 36/00698; H04W 36/00838; H04W 36/362; H04W 76/15; H04W 88/06
  See application file for complete search history.

(56) References Cited

U.S. PATENT DOCUMENTS

| | | | |
|---|---|---|---|
| 2022/0007247 A1* | 1/2022 | Yang | H04W 36/0058 |
| 2022/0086704 A1* | 3/2022 | Futaki | H04W 36/36 |
| 2022/0256411 A1* | 8/2022 | Liu | H04W 36/0058 |
| 2022/0353769 A1* | 11/2022 | Wang | H04W 36/08 |

FOREIGN PATENT DOCUMENTS

| | | | | |
|---|---|---|---|---|
| CN | 113545120 A | * | 10/2021 | ........ H04W 36/0027 |
| CN | 115398968 A | * | 11/2022 | ........ H04W 36/0061 |
| EP | 3758415 A1 | | 12/2020 | |
| JP | 7147875 B2 | * | 10/2022 | ........ H04W 36/0058 |
| WO | WO-2019161742 A1 | | 8/2019 | |
| WO | WO-2021109394 A1 | * | 6/2021 | ........ H04W 36/0069 |
| WO | 2021142707 A1 | | 7/2021 | |

OTHER PUBLICATIONS

International Search Report and Written Opinion—PCT/US2021/026451—ISA/EPO—Jul. 8, 2021.

NTT Docomo, et al., "Possible Discussion Points on Conditional PScell Addition/Change", 3GPP Draft, 3GPP TSG-RAN WG3 #105bis, R3-195684, Possible Discussion Points on Conditional PScell Addition Change R1, 3rd Generation Partnership Project (3GPP), Mobile Competence Centre, 650, Route Des Lucioles, F-06921 Sophi, vol. Ran WG3, No. Chongquing, China, Oct. 14, 2019-Oct. 18, 2019, Oct. 4, 2019 (Oct. 4, 2019), XP051809948, 9 Pages, Retrieved from the Internet: URL: https://ftp.3gpp.org/tsg_ran/WG3_lu/TSGR3_105bis/Docs/R3-195684.zip. R3-195684 Possible discussion points on Conditional PScell addition change r1 .doc [Retrieved on Oct. 4, 2019].

CATT: "Consideration on SN Initiated Conditional SN Change Procedure", 3GPP TSG-RAN3 Meeting #106, R3-196726, Reno, NV, USA, Nov. 18, 2019-Nov. 22, 2019, Nov. 9, 2019, 5 Pages.

* cited by examiner

SIGNALING ASPECTS OF A CONDITIONAL PRIMARY SECONDARY CELL CHANGE PROCEDURE IN MULTI-RADIO ACCESS TECHNOLOGY DUAL CONNECTIVITY

CROSS-REFERENCE TO RELATED APPLICATION

This Patent Application claims priority to U.S. Provisional Patent Application No. 63/022,081, filed on May 8, 2020, entitled "SIGNALING ASPECTS OF A CONDITIONAL PRIMARY SECONDARY CELL CHANGE PROCEDURE IN MULTI-RADIO ACCESS TECHNOLOGY DUAL CONNECTIVITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for signaling aspects of a conditional primary secondary cell (PSCell) change procedure in multi-radio access technology (multi-RAT) dual connectivity (DC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a master node (MN), may include receiving a message indicating that a UE has determined that a condition for a conditional primary secondary cell (PSCell) change has been satisfied for a candidate target PSCell, the candidate target PSCell being one of a set of candidate target PSCells associated with the UE in a conditional PSCell change configuration; and transmitting, to a source secondary node (SN), a confirmation message associated with the conditional PSCell change.

In some aspects, a method of wireless communication, performed by an MN, may include receiving, from a source SN, a message indicating, for a target SN, one or more MN terminated split bearers that are not accepted by the target SN during an SN addition associated with a conditional PSCell change; and transmitting, to the source SN, a revised master cell group (MCG) configuration, the indicated one or more MN terminated split bearers being excluded from the revised MCG configuration.

In some aspects, a method of wireless communication, performed by a source SN, may include receiving a confirmation message from an MN, the confirmation message indicating that a UE has determined that a condition for a conditional PSCell change has been satisfied by a candidate target PSCell; and forwarding data, associated with the UE, to the MN or to a target SN associated with the candidate target PSCell based at least in part on the confirmation message.

In some aspects, a method of wireless communication, performed by a target SN, may include receiving a request to release reserved resources of a candidate target PSCell associated with the target SN, the candidate target PSCell being one of a set of candidate target PSCells associated with a conditional PSCell change associated with a user equipment; and releasing the reserved resources of the candidate target PSCell based at least in part on the request.

In some aspects, a method of wireless communication, performed by a target SN, may include receiving a message indicating that a UE has determined that a condition for a conditional PSCell change has been satisfied for a candidate target PSCell; and transmitting, to a source SN, a confirmation message associated with the conditional PSCell change, the confirmation message including a candidate target PSCell identifier of the candidate target PSCell.

In some aspects, a method of wireless communication, performed by a UE, may include detecting a radio link failure on an MCG during a performance of a random access channel (RACH) procedure on a target PSCell for which the UE has determined that a condition for a conditional PSCell change has been satisfied; and performing an MCG failure information procedure after completion of the RACH procedure based at least in part on detecting the radio link failure on the MCG during the performance of the RACH procedure.

In some aspects, an MN for wireless communication may include a memory and one or more processors coupled to the memory. The memory and the one or more processors may be configured to receive a message indicating that a UE has determined that a condition for a conditional PSCell change has been satisfied for a candidate target PSCell, the candidate target PSCell being one of a set of candidate target PSCells associated with the UE in a conditional PSCell change configuration; and transmit, to a source SN, a confirmation message associated with the conditional PSCell change.

In some aspects, an MN for wireless communication may include a memory and one or more processors coupled to the memory. The memory and the one or more processors may be configured to receive, from a source SN, a message indicating, for a target SN, one or more MN terminated split bearers that are not accepted by the target SN during an SN addition associated with a conditional PSCell change; and transmit, to the source SN, a revised MCG configuration, the indicated one or more MN terminated split bearers being excluded from the revised MCG configuration.

In some aspects, a source SN for wireless communication may include a memory and one or more processors coupled to the memory. The memory and the one or more processors may be configured to receive a confirmation message from an MN, the confirmation message indicating that a UE has determined that a condition for a conditional PSCell change has been satisfied by a candidate target PSCell; and forward data, associated with the UE, to the MN or to a target SN associated with the candidate target PSCell based at least in part on the confirmation message.

In some aspects, a target SN for wireless communication may include a memory and one or more processors coupled to the memory. The memory and the one or more processors may be configured to receive a request to release reserved resources of a candidate target PSCell associated with the target SN, the candidate target PSCell being one of a set of candidate target PSCells associated with a conditional PSCell change associated with a user equipment; and release the reserved resources of the candidate target PSCell based at least in part on the request.

In some aspects, a target SN for wireless communication may include a memory and one or more processors coupled to the memory. The memory and the one or more processors may be configured to receive a message indicating that a UE has determined that a condition for a conditional PSCell change has been satisfied for a candidate target PSCell; and transmit, to a source SN, a confirmation message associated with the conditional PSCell change, the confirmation message including a candidate target PSCell identifier of the candidate target PSCell.

In some aspects, a UE for wireless communication may include a memory and one or more processors coupled to the memory. The memory and the one or more processors may be configured to detect a radio link failure on an MCG during a performance of a RACH procedure on a target PSCell for which the UE has determined that a condition for a conditional PSCell change has been satisfied; and perform an MCG failure information procedure after completion of the RACH procedure based at least in part on detecting the radio link failure on the MCG during the performance of the RACH procedure.

In some aspects, a non-transitory computer-readable medium may store one or more instructions for wireless communication. The one or more instructions, when executed by one or more processors of an MN, may cause the one or more processors to receive a message indicating that a UE has determined that a condition for a conditional PSCell change has been satisfied for a candidate target PSCell, the candidate target PSCell being one of a set of candidate target PSCells associated with the UE in a conditional PSCell change configuration; and transmit, to a source SN, a confirmation message associated with the conditional PSCell change.

In some aspects, a non-transitory computer-readable medium may store one or more instructions for wireless communication. The one or more instructions, when executed by one or more processors of an MN, may cause the one or more processors to receive, from a source SN, a message indicating, for a target SN, one or more MN terminated split bearers that are not accepted by the target SN during an SN addition associated with a conditional PSCell change; and transmit, to the source SN, a revised MCG configuration, the indicated one or more MN terminated split bearers being excluded from the revised MCG configuration.

In some aspects, a non-transitory computer-readable medium may store one or more instructions for wireless communication. The one or more instructions, when executed by one or more processors of a source SN, may cause the one or more processors to receive a confirmation message from an MN, the confirmation message indicating that a UE has determined that a condition for a conditional PSCell change has been satisfied by a candidate target PSCell; and forward data, associated with the UE, to the MN or to a target SN associated with the candidate target PSCell based at least in part on the confirmation message.

In some aspects, a non-transitory computer-readable medium may store one or more instructions for wireless communication. The one or more instructions, when executed by one or more processors of a target SN, may cause the one or more processors to receive a request to release reserved resources of a candidate target PSCell associated with the target SN, the candidate target PSCell being one of a set of candidate target PSCells associated with a conditional PSCell change associated with a user equipment; and release the reserved resources of the candidate target PSCell based at least in part on the request.

In some aspects, a non-transitory computer-readable medium may store one or more instructions for wireless communication. The one or more instructions, when executed by one or more processors of a target SN, may cause the one or more processors to receive a message indicating that a UE has determined that a condition for a conditional PSCell change has been satisfied for a candidate target PSCell; and transmit, to a source SN, a confirmation message associated with the conditional PSCell change, the confirmation message including a candidate target PSCell identifier of the candidate target PSCell.

In some aspects, a non-transitory computer-readable medium may store one or more instructions for wireless communication. The one or more instructions, when executed by one or more processors of a UE, may cause the one or more processors to detect a radio link failure on an MCG during a performance of a RACH procedure on a target PSCell for which the UE has determined that a condition for a conditional PSCell change has been satisfied; and perform an MCG failure information procedure after completion of the RACH procedure based at least in part on detecting the radio link failure on the MCG during the performance of the RACH procedure.

In some aspects, an apparatus for wireless communication may include means for receiving a message indicating that a UE has determined that a condition for a conditional PSCell change has been satisfied for a candidate target PSCell, the candidate target PSCell being one of a set of candidate target PSCells associated with the UE in a conditional PSCell change configuration; and means for transmitting, to a source SN, a confirmation message associated with the conditional PSCell change.

In some aspects, an apparatus for wireless communication may include means for receiving, from a source SN, a message indicating, for a target SN, one or more MN terminated split bearers that are not accepted by the target SN during an SN addition associated with a conditional PSCell change; and means for transmitting, to the source SN, a revised MCG configuration, the indicated one or more MN terminated split bearers being excluded from the revised MCG configuration.

In some aspects, an apparatus for wireless communication may include means for receiving a confirmation message from an MN, the confirmation message indicating that a UE has determined that a condition for a conditional PSCell change has been satisfied by a candidate target PSCell; and means for forwarding data, associated with the UE, to the MN or to a target SN associated with the candidate target PSCell based at least in part on the confirmation message.

In some aspects, an apparatus for wireless communication may include means for receiving a request to release reserved resources of a candidate target PSCell associated with the apparatus, the candidate target PSCell being one of a set of candidate target PSCells associated with a conditional PSCell change associated with a user equipment; and means for releasing the reserved resources of the candidate target PSCell based at least in part on the request.

In some aspects, an apparatus for wireless communication may include means for receiving a message indicating that a UE has determined that a condition for a conditional PSCell change has been satisfied for a candidate target PSCell; and means for transmitting, to a source SN, a confirmation message associated with the conditional PSCell change, the confirmation message including a candidate target PSCell identifier of the candidate target PSCell.

In some aspects, an apparatus for wireless communication may include means for detecting a radio link failure on an MCG during a performance of a RACH procedure on a target PSCell for which the apparatus has determined that a condition for a conditional PSCell change has been satisfied; and means for performing an MCG failure information procedure after completion of the RACH procedure based at least in part on detecting the radio link failure on the MCG during the performance of the RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
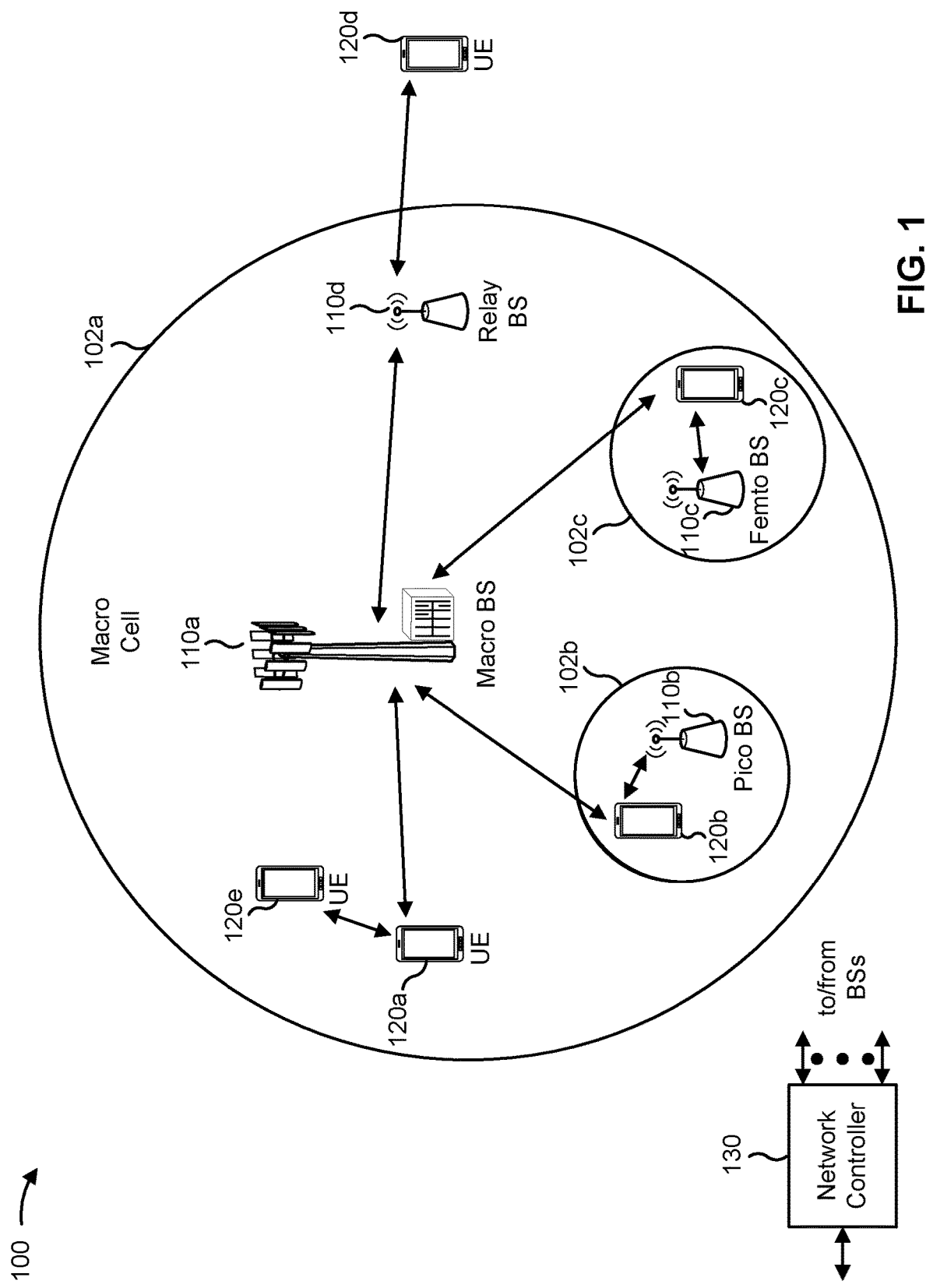
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
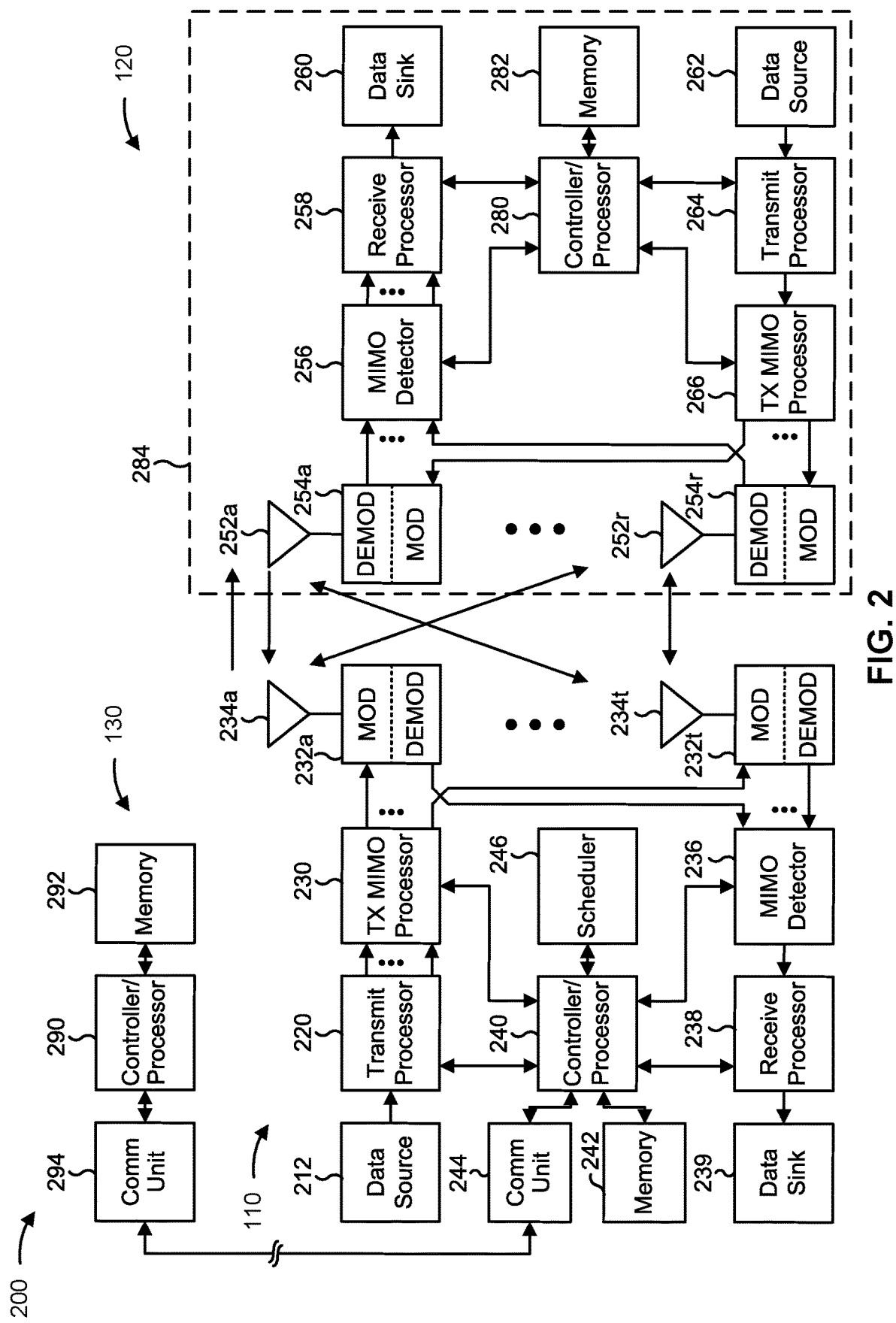
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A, 3B, 4A, 4B, 5A, 5B, and 6-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A, 3B, 4A, 4B, 5A, 5B, and 6-14).

Controller/processor 240 of base station 110, controller/processor 280 of UE 120, and/or any other component(s) of FIG. 2 may perform one or more techniques associated with signaling aspects of a conditional PSCell change procedure in multi-RAT DC (MR-DC), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, and/or compiling the instructions, interpreting the instructions.

In some aspects, base station 110 may include means for receiving a message indicating that a UE 120 has determined that a condition for a conditional PSCell change has been satisfied for a candidate target PSCell, the candidate target PSCell being one of a set of candidate target PSCells associated with the UE in a conditional PSCell change configuration; means for transmitting, to a source SN, a confirmation message associated with the conditional PSCell change; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving, from a source SN, a message indicating, for a target SN, one or more MN terminated split bearers that are not accepted by the target SN during an SN addition associated with a conditional PSCell change; means for transmitting, to the source SN, a revised MCG configuration, the indicated one or more MN terminated split bearers being excluded from the revised MCG configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving a confirmation message from an MN, the confirmation message indicating that a UE 120 has determined that a condition for a conditional PSCell change has been satisfied by a candidate target PSCell; means for forwarding data, associated with the UE, to the MN or to a target SN associated with the candidate target PSCell based at least in part on the confirmation message; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving a request to release reserved resources of a candidate target PSCell associated with a target SN, the candidate target PSCell being one of a set of candidate target PSCells associated with a conditional PSCell change associated with a user equipment; means for releasing the reserved resources of the candidate target PSCell based at least in part on the request and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving a message indicating that a UE 120 has determined that a condition for a conditional PSCell change has been satisfied for a candidate target PSCell; means for transmitting, to a source SN, a confirmation message associated with the conditional PSCell change, the confirmation message including a candidate target PSCell identifier of the candidate target PSCell; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for detecting a radio link failure on an MCG during a performance of a RACH procedure on a target PSCell for which the UE has determined that a condition for a conditional PSCell change has been satisfied; means for performing an MCG failure information procedure after completion of the RACH procedure based at least in part on detecting the radio link failure on the MCG during the performance of the RACH procedure; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In a wireless communication system, dual connectivity (DC) aims to utilize radio resources within multiple carriers. DC can be used to increase throughput, provide mobility robustness, support load-balancing among network nodes, and/or the like. A DC mode of operation is a mode in which a UE (e.g., a UE 120) is configured to utilize radio resources of two distinct schedulers located in two network nodes (e.g., two base stations 110). These network nodes are referred to as a master node (MN) and a secondary node (SN). Thus, DC enables a UE to simultaneously transmit and receive data on multiple component carriers from groups of cells via the MN and the SN. In the context of DC, a master cell group (MCG) is a group of serving cells associated with the MN and includes a primary cell (Pcell) and optionally one or more secondary cells (Scells). Further, a secondary cell group (SCG) is a group of serving cells associated with the SN and includes a primary secondary cell (PScell) and optionally one or more Scells.

A particular example of DC is Evolved-UMTS Terrestrial Radio Access Network (E-UTRAN) NR-DC, which is referred to as EN-DC. EN-DC allows a UE to connect to an LTE base station (e.g., that acts as an MN) and an NR base station (e.g., that acts as an SN). An EN-DC enabled UE registers with an LTE core network (i.e., the LTE evolved packet core (EPC)) and reports measurements on NR frequencies. If signal quality for the UE supports NR service, then the LTE base station communicates with the NR base station to assign resources for a bearer. The NR resource assignment is then signaled to the UE via an LTE radio resource control (RRC) connection reconfiguration message. Once the RRC connection reconfiguration procedure is complete, the UE simultaneously connects to the LTE and NR networks. In EN-DC, a secondary cell group addition is performed using an RRC procedure. For example, an RRC connection reconfiguration procedure may be used to add, modify, or release a secondary cell group based on NR measurements performed by the UE. An implementation of DC that uses multiple radio access technologies (RATs), such as EN-DC, can be referred to as multi-RAT DC (MR-DC).

In MR-DC operation, a conditional PSCell addition procedure can be performed in order to cause a candidate target PSCell of a target SN to be added in association with serving a UE. Here, the conditional PSCell addition is performed based on the UE detecting that a condition for the conditional PSCell addition has been satisfied for the target candidate PSCell. Similarly, in MR-DC operation, a conditional PSCell change procedure can be performed in order to cause a PSCell serving the UE to be changed from a source PSCell to a candidate target PSCell. Here, the candidate target PSCell may be associated with the source SN (i.e., the conditional PSCell change may be intra-SN) or may be associated with a target SN (i.e., the conditional PSCell change may be inter-SN). Here, the conditional PSCell change is performed based on the UE detecting that a condition for the conditional PSCell change has been satisfied for the target candidate PSCell. A conditional PSCell addition or a conditional PSCell change can be initiated by the MN or can be initiated by the SN. However, some signaling aspects of a conditional PSCell change procedure (e.g., in MR-DC) need to be defined in order to ensure reliable performance of the conditional PSCell change.

Some aspects described herein provide techniques and apparatuses for signaling aspects of a conditional PSCell change procedure in MR-DC. The signaling aspects of a conditional PSCell change procedure in MR-DC are described below in the context of various types of conditional PSCell change procedures.

FIGS. 3A, 3B, 4A, 4B, 5A, 5B, 6, 7, and 8 are diagrams illustrating examples associated with signaling aspects of a conditional PSCell change procedure in MR-DC, in accordance with the present disclosure. In FIGS. 3A, 3B, 4A, 4B, 5A, 5B, 6, 7, and 8, an MR-DC UE (e.g., a UE 120) is connected to an MN (e.g., a first base station 110) and an SN (e.g., a second base station 110), and a source PSCell serving the UE is associated with the SN.

Figure 3A:
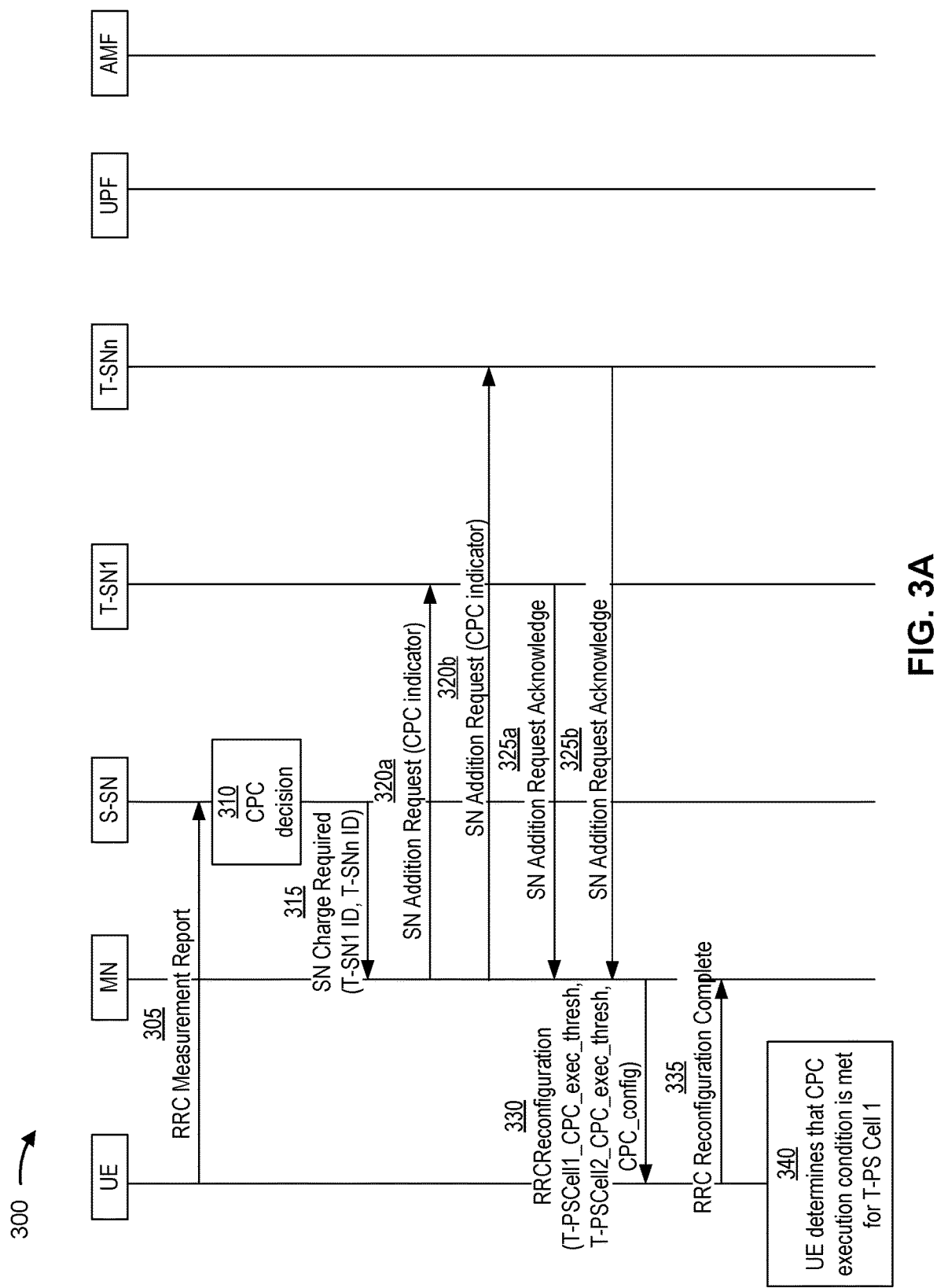
FIGS. 3A and 3B are diagrams illustrating an example of an SN-initiated conditional PSCell change, in accordance with the present disclosure.
Figure 3B:
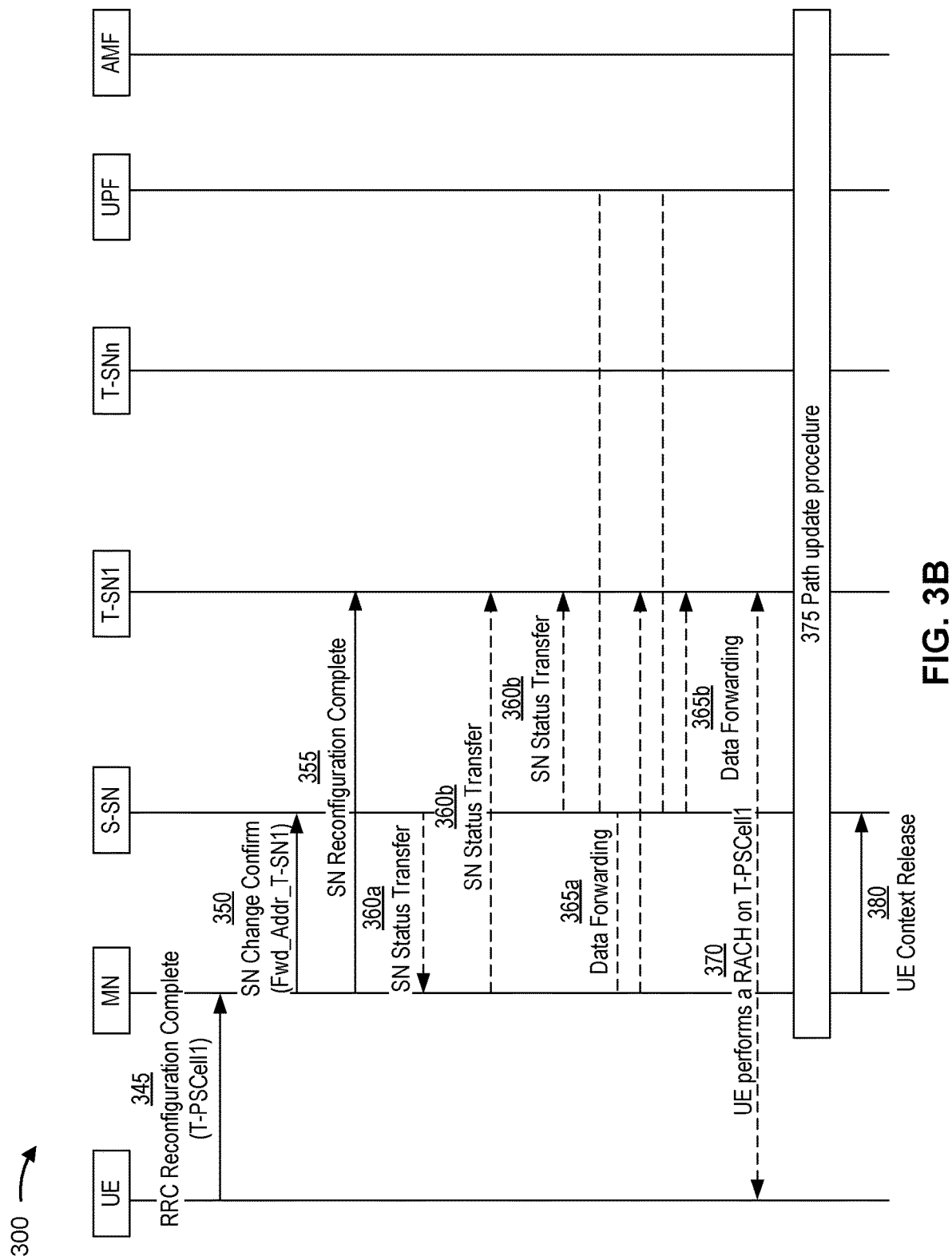

FIGS. 3A and 3B are diagrams illustrating an example 300 of an SN-initiated conditional PSCell change. In example 300, the SN is a source SN and the PSCell is being changed to a candidate target PSCell associated with a target SN (e.g., a third base station 110). That is, the conditional PSCell change is an inter-SN conditional PSCell change in example 300.

As shown by reference 305, the UE may provide, to the source SN, a measurement report (e.g., an RRC measurement report). In some aspects, the measurement report may include a result of a measurement associated with the source PSCell of the UE and results of measurements associated with a group of candidate target PSCells. Here, the group of candidate target PSCells includes one or more candidate target PSCells configured on the UE (e.g., at an earlier time).

As shown by reference 310, the source SN may determine that a conditional PSCell change (CPC) procedure is to be initiated based at least in part on the measurement report. For example, the source SN may determine that a result of a measurement associated with the source PSCell fails to satisfy a threshold (e.g., that a signal strength associated with the source PSCell is below a signal strength threshold), and may determine that the conditional PSCell change is to be initiated.

As shown by reference 315, the source SN may transmit, to the MN, a change message (e.g., an SN change required message) based at least in part on determining that the conditional PSCell change procedure is to be initiated. In some aspects, the change message may include an indicator indicating that a conditional PSCell change procedure is being initiated. In some aspects, as indicated in FIG. 3A, the change message may include a set of n (n≥1) candidate target SN identifiers (e.g., T-SN1 ID, T-SNn ID). Here, each candidate target SN identifier corresponds to a respective candidate target SN for the UE included in a set of candidate target SNs.

As shown by references 320a and 320b, the MN may, based at least in part on the set of candidate target SN identifier, transmit an SN addition request message to each of the candidate target SNs. As shown, in some aspects, the SN addition request message may include a conditional PSCell change indicator (e.g., an indication that the requested SN addition is associated with a conditional PSCell change procedure).

As shown by references 325a and 325b, each candidate target SN may transmit, to the MN, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved).

As shown by reference 330, the MN may, upon receiving the acknowledgments from the set of candidate target SNs, transmit a reconfiguration message (e.g., an RRC reconfiguration message) to the UE. As shown, in some aspects, the reconfiguration message may include configuration information associated with the conditional PSCell change (e.g., CPC_config). The configuration information may include, for example, information associated with each of the set of candidate target PSCells. As further shown, the reconfiguration message may include information indicating a condition for each candidate target PSCell (e.g., T-PSCell1_CPC_exec_thresh, T-PSCell2_CPC_exec_thresh, and/or the like) that, if satisfied, is to cause the UE to execute the conditional PSCell change.

As shown by reference 335, the UE may receive the reconfiguration message and may provide a reconfiguration complete message (e.g., an RRC reconfiguration complete message) to the MN.

As shown by reference 340, the UE may determine that a condition for the conditional PSCell change has been satisfied for a candidate target PSCell (e.g., one of the set of candidate target PSCells). For example, the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount identified by a condition indicated for the candidate target PSCell, and/or the like.

As shown in FIG. 3B by reference 345, the UE may transmit a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

In some aspects, based at least in part on receiving the reconfiguration complete message, the MN may further transmit, to one or more candidate target SNs, a request to release reserved resources of candidate target PSCells associated with the one or more other candidate target SNs. In some aspects, the request may include a list of candidate target PSCells for which reserved resources are to be released at the one or more other target SNs. In some aspects, the one or more candidate target SNs may release the reserved resources of the candidate target PSCell based at least in part on the request.

As shown by reference 350, the MN may transmit a confirmation message (e.g., an SN change confirm message) associated with the conditional PSCell change to the source SN. In some aspects, as shown, the confirmation message includes a data forwarding address of the target SN (e.g., Fwd_Addr_T-SN1) associated with the candidate target PSCell (e.g., so that the source SN can forward data directly to the target SN). In some aspects, the confirmation includes a data forwarding address of the MN (e.g., so that the source SN can forward data to the target SN via the MN). In some aspects, upon receiving the confirmation message, the source SN releases resources for the UE.

As shown by reference 355, the MN may transmit an SN reconfiguration complete message to the target SN associated with the candidate target PSCell.

As shown by references 360*a* and 360*b*, the MN and the source SN may transmit respective SN status transfer messages to the target SN, after which data forwarding can begin, as indicated by references 365*a* (indirect data forwarding) and 365*b* (direct data forwarding).

As shown by reference 370, the UE may then perform a random access channel (RACH) procedure on the candidate target PSCell. Notably, in some aspects, the UE may perform the RACH procedure any time after determining that the condition for the conditional PSCell change has been satisfied for the candidate target PSCell (e.g., during a time at which operations associated with references 345 through 365 are being performed).

As shown by reference 375, a path update procedure may be performed and, as shown by reference 380, the MN may transmit a context release, associated with the UE, to the source SN.

Figure 4A:
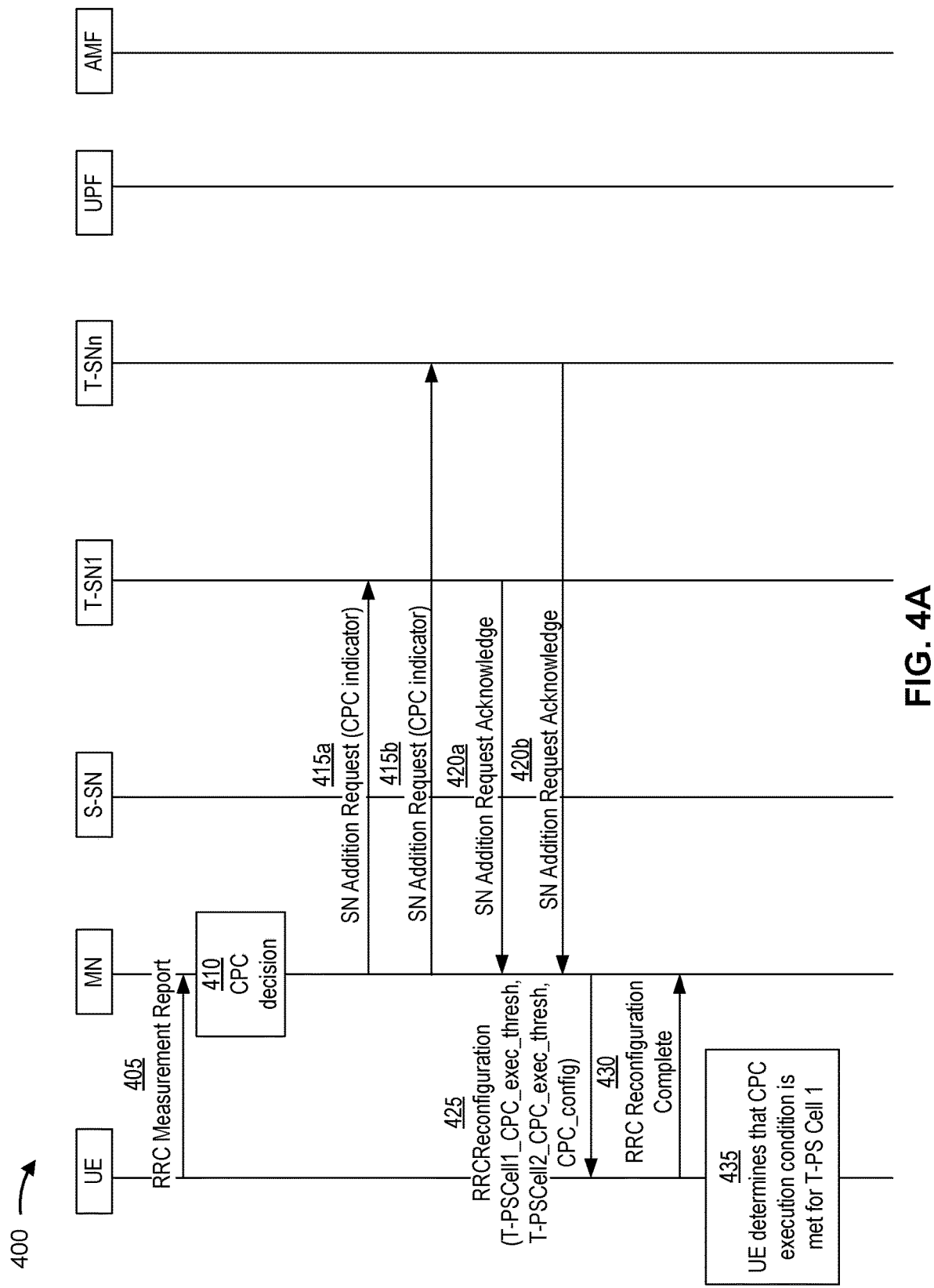
FIGS. 4A and 4B are diagrams illustrating an example of an MN-initiated conditional PSCell change, in accordance with the present disclosure.
Figure 4B:
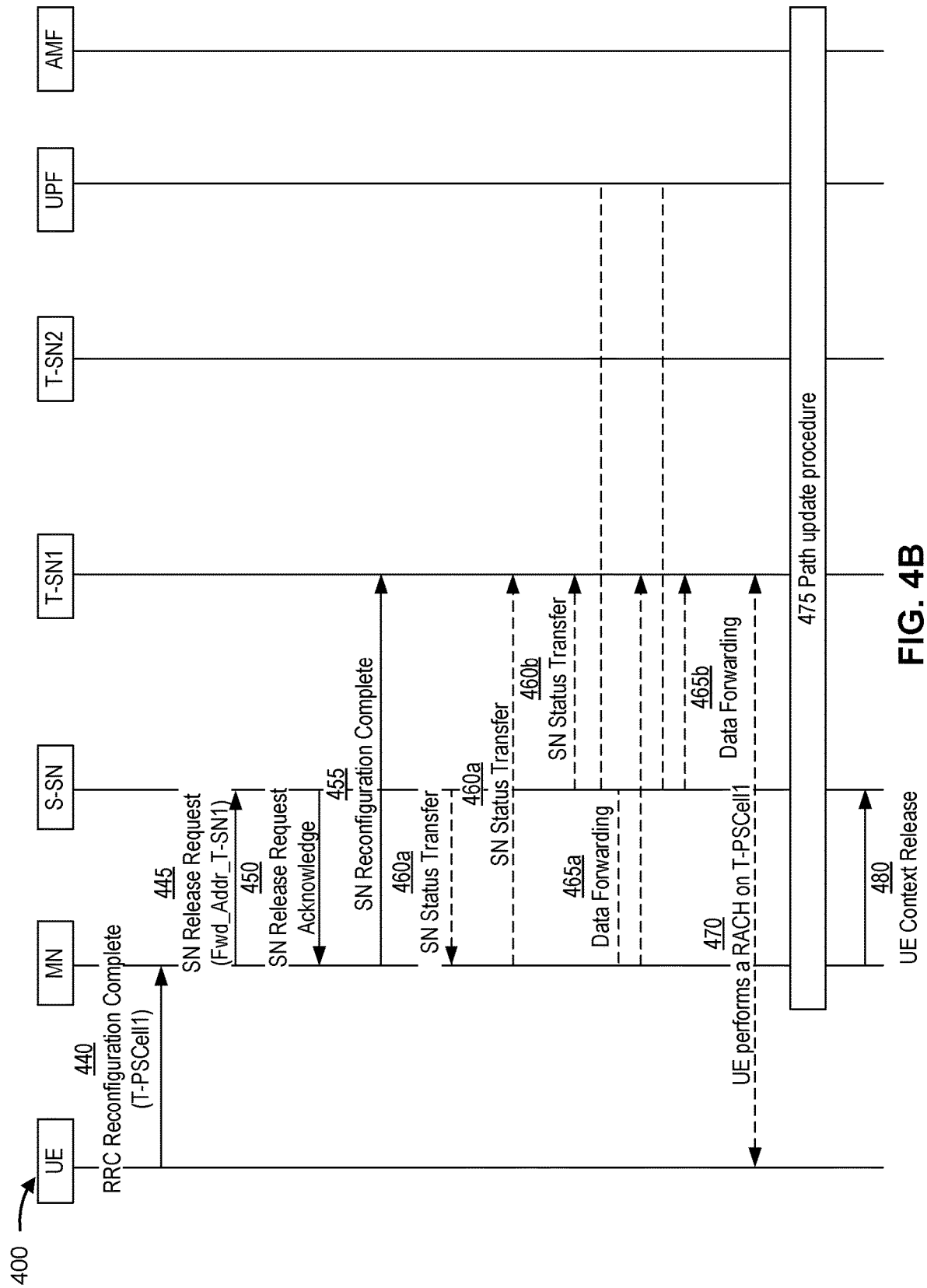

FIGS. 4A and 4B are diagrams illustrating an example 400 of an MN-initiated conditional PSCell change. In example 400, the SN is a source SN and the PSCell is being changed to a candidate target PSCell associated with a target SN. That is, the conditional PSCell change is an inter-SN conditional PSCell change in example 400.

As shown by reference 405, the UE may provide, to the MN, a measurement report (e.g., an RRC measurement report). In some aspects, the measurement report may include a result of a measurement associated with the source PSCell of the UE and/or results of measurements associated with a group of candidate target PSCells.

As shown by reference 410, the MN may determine that a conditional PSCell change procedure is to be initiated based at least in part on the measurement report. For example, the MN may determine that a result of a measurement associated with the source PSCell fails to satisfy a threshold (e.g., that a signal strength associated with the source PSCell is below a signal strength threshold), and may determine that the conditional PSCell change is to be initiated.

As shown by references 415*a* and 415*b*, the MN may, based at least in part on a set of candidate target SN identifiers associated with a set of candidate target PSCells for the UE, transmit an SN addition request message to each of the candidate target SNs. As shown, in some aspects, the SN addition request message may include a conditional PSCell change indicator (e.g., an indication that the requested SN addition is associated with a conditional PSCell change procedure).

As shown by references 420*a* and 420*b*, each candidate target SN may transmit, to the MN, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved).

As shown by reference 425, the MN may, upon receiving the acknowledgments from the set of candidate target SNs, transmit a reconfiguration message (e.g., an RRC reconfiguration message) to the UE. As shown, in some aspects, the reconfiguration message may include configuration information associated with the conditional PSCell change. The configuration information may include, for example, information associated with each of the set of candidate target PSCells. As further shown, the reconfiguration message may include information indicating a condition for each candidate target PSCell that, if satisfied, is to cause the UE to execute the conditional PSCell change.

As shown by reference 430, the UE may receive the reconfiguration message and may provide a reconfiguration complete message (e.g., an RRC reconfiguration complete message) to the MN.

As shown by reference 435, the UE may determine that a condition for the conditional PSCell change has been satisfied for a candidate target PSCell (e.g., one of the set of candidate target PSCells). For example the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount identified by a condition indicated for the candidate target PSCell, and/or the like.

As shown in FIG. 4B by reference 440, the UE may transmit a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

In some aspects, based at least in part on receiving the reconfiguration complete message, the MN may further transmit, to one or more candidate target SNs, a request to release reserved resources of candidate target PSCells associated with the one or more other candidate target SNs. In some aspects, the request may include a list of candidate target PSCells for which reserved resources are to be released at the one or more other target SNs. In some aspects, the one or more candidate target SNs may release the reserved resources of the candidate target PSCell based at least in part on the request.

As shown by reference 445, the MN may transmit a confirmation message (e.g., an SN release request message) associated with the conditional PSCell change to the source SN. In some aspects, the confirmation message includes a data forwarding address of the target SN associated with the candidate target PSCell (e.g., so that the source SN can forward data directly to the target SN). In some aspects, the confirmation includes a data forwarding address of the MN (e.g., so that the source SN can forward data to the target SN via the MN). In some aspects, upon receiving the confirmation message, the source SN releases resources for the UE.

As shown by reference 450, the source SN may transmit, and the MN may receive, an acknowledgment of the release request (e.g., an SN release request acknowledge message).

As shown by reference 455, the MN may transmit an SN reconfiguration complete message to the target SN associated with the candidate target PSCell.

As shown by references 460*a* and 460*b*, the MN and the source SN (via the MN) may transmit respective SN status transfer messages to the target SN, after which data forwarding can begin, as indicated by references 465*a* (indirect data forwarding) and 465*b* (direct data forwarding).

As shown by reference 470, the UE may then perform a random access channel (RACH) procedure on the candidate target PSCell. Notably, in some aspects, the UE may perform the RACH procedure any time after determining that the condition for the conditional PSCell change has been satisfied for the candidate target PSCell (e.g., during a time at which operations associated with references 445 through 465 are being performed).

As shown by reference 475, a path update procedure may be performed and, as shown by reference 480, the MN may transmit a context release, associated with the UE, to the source SN.

Figure 5A:
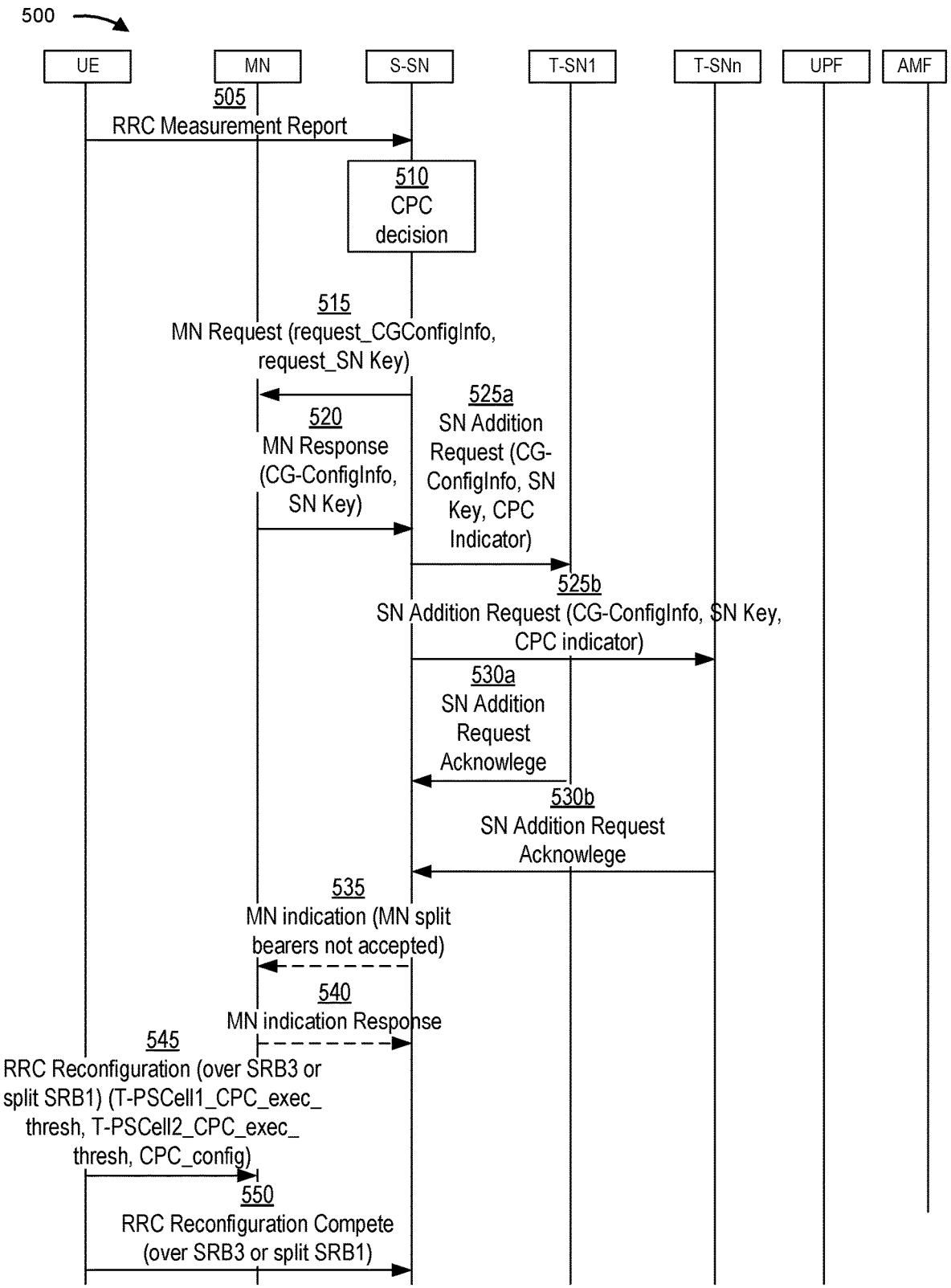
FIGS. 5A and 5B are diagrams illustrating an example of an SN-initiated and SN-executed conditional PSCell change, in accordance with the present disclosure.
Figure 5B:
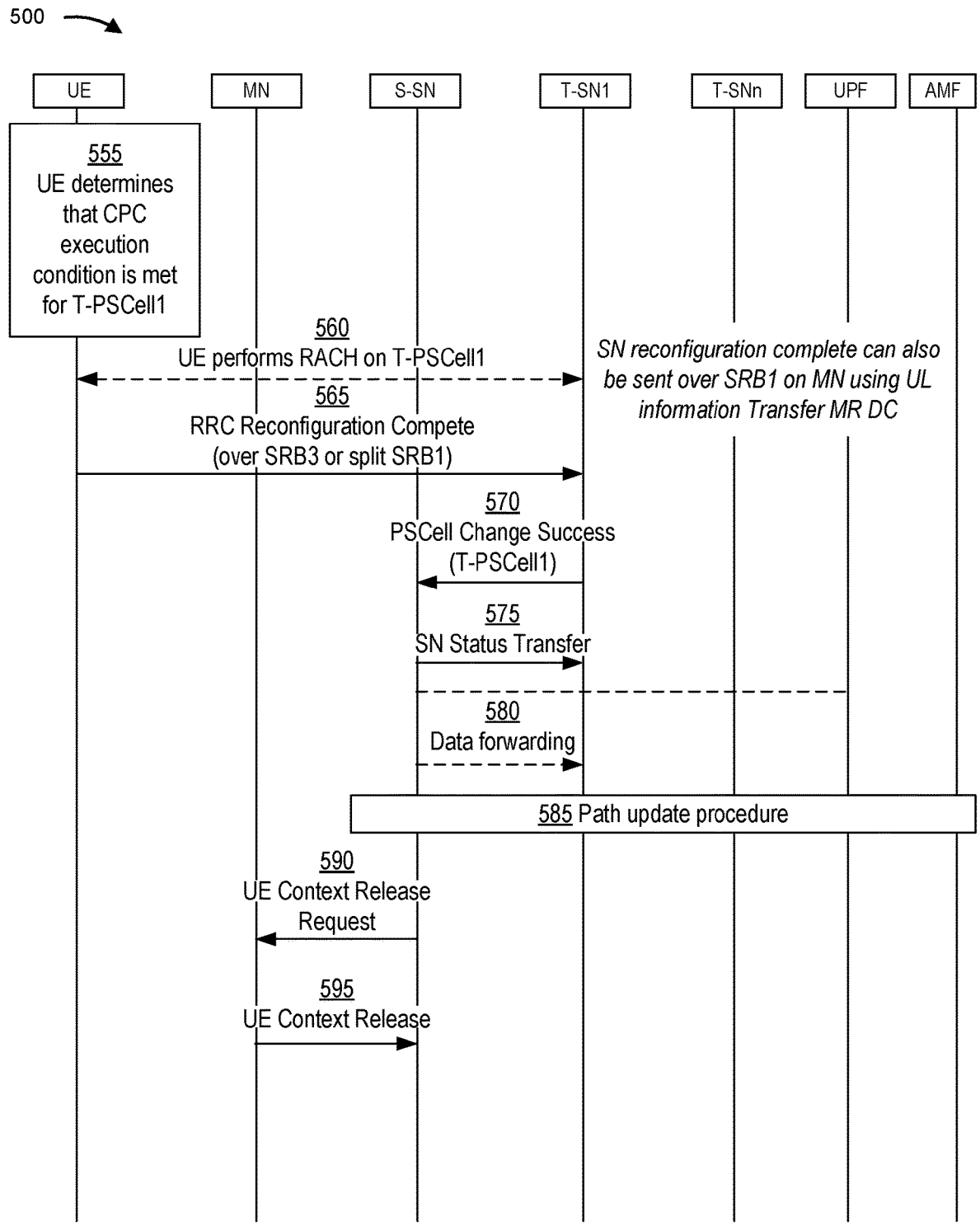

FIGS. 5A and 5B are diagrams illustrating an example 500 of an SN-initiated and SN-executed conditional PSCell change. In example 500, the SN is a source SN and the PSCell is being changed to a candidate target PSCell associated with a target SN. That is, the conditional PSCell change is an inter-SN conditional PSCell change in example 500.

As shown by reference 505, the UE may provide, to the source SN, a measurement report (e.g., an RRC measurement report). In some aspects, the measurement report may include a result of a measurement associated with the source PSCell of the UE and results of measurements associated with a group of candidate target PSCells. Here, the group of candidate target PSCells includes one or more candidate target PSCells configured on the UE (e.g., at an earlier time).

As shown by reference 510, the source SN may determine that a conditional PSCell change procedure is to be initiated based at least in part on the measurement report. For example, the source SN may determine that a result of a measurement associated with the source PSCell fails to satisfy a threshold (e.g., that a signal strength associated with the source PSCell is below a signal strength threshold), and may determine that the conditional PSCell change is to be initiated.

As shown by reference 515, the source SN may transmit, and the MN may receive, an MN request message. In some aspects, the MN request message may include a request to provide an MCG configuration (e.g., request_CGConfigInfo) associated with the MN and a request for an SN key (e.g., request_SNKey) to be used for the conditional PSCell change.

As shown by reference 520, the MN may provide, to the SN, an MN response message that includes the MCG configuration and the SN key.

As shown by references 525a and 525b, the source SN may transmit an SN addition request message to each of the candidate target SNs. As shown, in some aspects, the SN addition request message may include a conditional PSCell change indicator (e.g., an indication that the requested SN addition is associated with a conditional PSCell change procedure), the MCG configuration associated with the MN, and the SN key.

As shown by references 530a and 530b, each candidate target SN may transmit, to the source SN, an acknowledgment of the SN addition request (e.g., an SN addition request acknowledge message). In some aspects, an acknowledgment provided by a given candidate target SN may include information associated with a set of candidate target PSCells, SCG configurations associated with the set of candidate target PSCells, and data forwarding addresses, if needed (e.g., for bearers whose termination point would be moved). In some aspects, the acknowledgment provided by the given candidate target SN may include an indication that one or more MN terminated split bearers, associated with the MCG configuration, are not accepted by the candidate target SN during an SN addition associated with the conditional PSCell change.

As shown by reference 535, the source SN may transmit, and the MN may receive, a message indicating, for a given target SN, one or more MN terminated split bearers that are not accepted by the target SN.

As shown by reference 540, the MN may transmit, to the source SN, a revised MCG configuration based at least in part on the message indicating the one or more MN terminated split bearers that are not accepted by the target SN. Here, the indicated one or more MN terminated split bearers may not be included in the revised MCG configuration (e.g., the MN may provide a revised MCG that excludes the indicated MN terminated split bearers).

As shown by reference 545, the source SN may then transmit a reconfiguration message (e.g., an RRC reconfiguration message) to the UE (e.g., over signaling radio bearer (SRB) 3 or split SRB1). As shown, in some aspects, the reconfiguration message may include configuration information associated with the conditional PSCell change (e.g., CPC_config). The configuration information may include, for example, information associated with each of the set of candidate target PSCells. As further shown, the reconfiguration message may include information indicating a condition for each candidate target PSCell (e.g., T-PSCell1_CPC_exec_thresh, T-PSCell2_CPC_exec_thresh, etc.) that, if satisfied, is to cause the UE to execute the conditional PSCell change. In some aspects, the reconfiguration message may include a conditional PSCell change configuration that includes the revised MCG configuration and an SCG configuration.

As shown by reference 550, the UE may receive the reconfiguration message and may provide (e.g., over SRB1 or split SRB1) a reconfiguration complete message (e.g., an RRC reconfiguration complete message) to the MN.

As shown in FIG. 5B by reference 555, the UE may determine that a condition for the conditional PSCell change has been satisfied for a candidate target PSCell (e.g., one of the set of candidate target PSCells). For example the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like. As shown by reference 560, the UE may then perform a RACH procedure on the candidate target PSCell.

As shown by reference 565, the UE may transmit, to the candidate target SN (e.g., over SRB3 or split SRB1), a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

As shown by reference 570, the candidate target SN may transmit, to the source SN, a PSCell change success message. In some aspects, the PSCell change success message may include information that identifies the candidate target PSCell to which the UE has changed.

As shown by reference 575, the source SN may transmit an SN status transfer message to the target SN, after which data forwarding can begin, as indicated by reference 580.

As shown by reference 585, a path update procedure may be performed. As shown by reference 590, the source SN may transmit a UE context release request to the MN and, as shown by reference 595, the MN may transmit a UE context release to the source SN.

Figure 6:
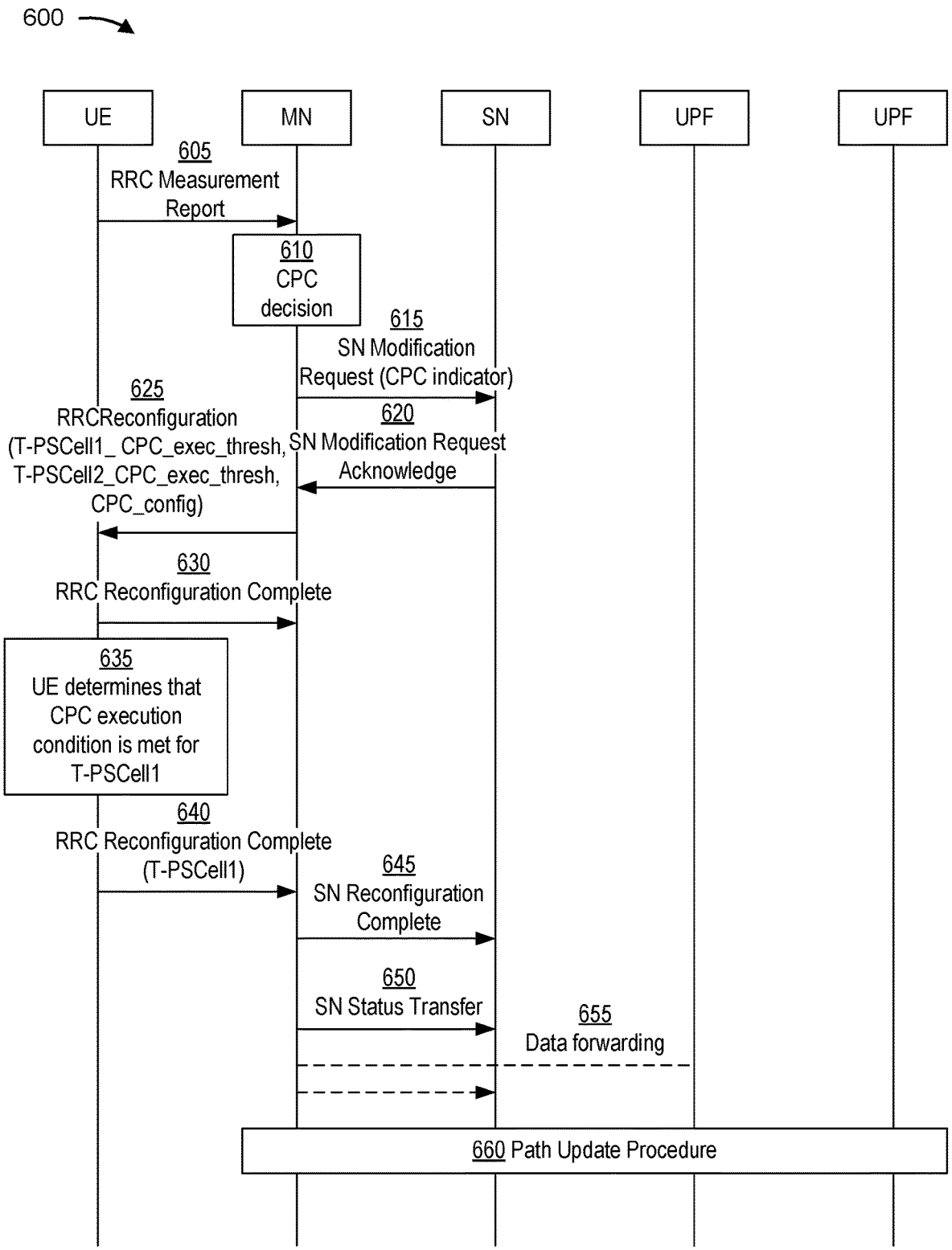
FIG. 6 is a diagram illustrating an example of an MN-initiated intra-SN conditional PSCell change, in accordance with the present disclosure.

FIG. 6 is a diagram illustrating an example 600 of an MN-initiated intra-SN conditional PSCell change. In example 600, the PSCell is being changed to a candidate target PSCell associated with the SN. That is, the conditional PSCell change is an intra-SN conditional PSCell change in example 600.

As shown by reference 605, the UE may provide, to the MN, a measurement report (e.g., an RRC measurement report). In some aspects, the measurement report may include a result of a measurement associated with the source PSCell of the UE and/or results of measurements associated with a group of candidate target PSCells.

As shown by reference 610, the MN may determine that a conditional PSCell change procedure is to be initiated based at least in part on the measurement report. For example, the MN may determine that a result of a measurement associated with the source PSCell fails to satisfy a threshold (e.g., that a signal strength associated with the source PSCell is below a signal strength threshold), and may determine that the conditional PSCell change is to be initiated.

As shown by reference 615, the MN may transmit an SN modification request message to the SN. As shown, in some aspects, the SN modification request message may include a conditional PSCell change indicator (e.g., an indication that the requested SN modification is associated with a conditional PSCell change procedure).

As shown by reference 620, the SN may transmit, to the MN, an acknowledgment of the SN modification request (e.g., an SN modification request acknowledge message). In some aspects, an acknowledgment provided by the SN may include information associated with a set of candidate target PSCells, SCG configurations associated with the set of candidate target PSCells, and data forwarding addresses, if needed (e.g., for bearers whose termination point would be moved).

As shown by reference 625, the MN may transmit a reconfiguration message (e.g., an RRC reconfiguration message) to the UE. As shown, in some aspects, the reconfiguration message may include configuration information associated with the conditional PSCell change. The configuration information may include, for example, information associated with each of the set of candidate target PSCells. As further shown, the reconfiguration message may include information indicating a condition for each candidate target PSCell that, if satisfied, is to cause the UE to execute the conditional PSCell change.

As shown by reference 630, the UE may receive the reconfiguration message and may provide a reconfiguration complete message (e.g., an RRC reconfiguration complete message) to the MN.

As shown by reference 635, the UE may determine that a condition for the conditional PSCell change has been satisfied for a candidate target PSCell (e.g., one of the set of candidate target PSCells). For example, the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like.

As shown by reference 640, the UE may transmit a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

As shown by reference 645, the MN may transmit a confirmation message (e.g., an SN reconfiguration complete message) associated with the conditional PSCell change to the SN.

As shown by reference 650, the MN may transmit an SN status transfer message to the SN, after which data forwarding can begin, as indicated by reference 655. As shown by reference 660, a path update procedure may be performed.

Figure 7:
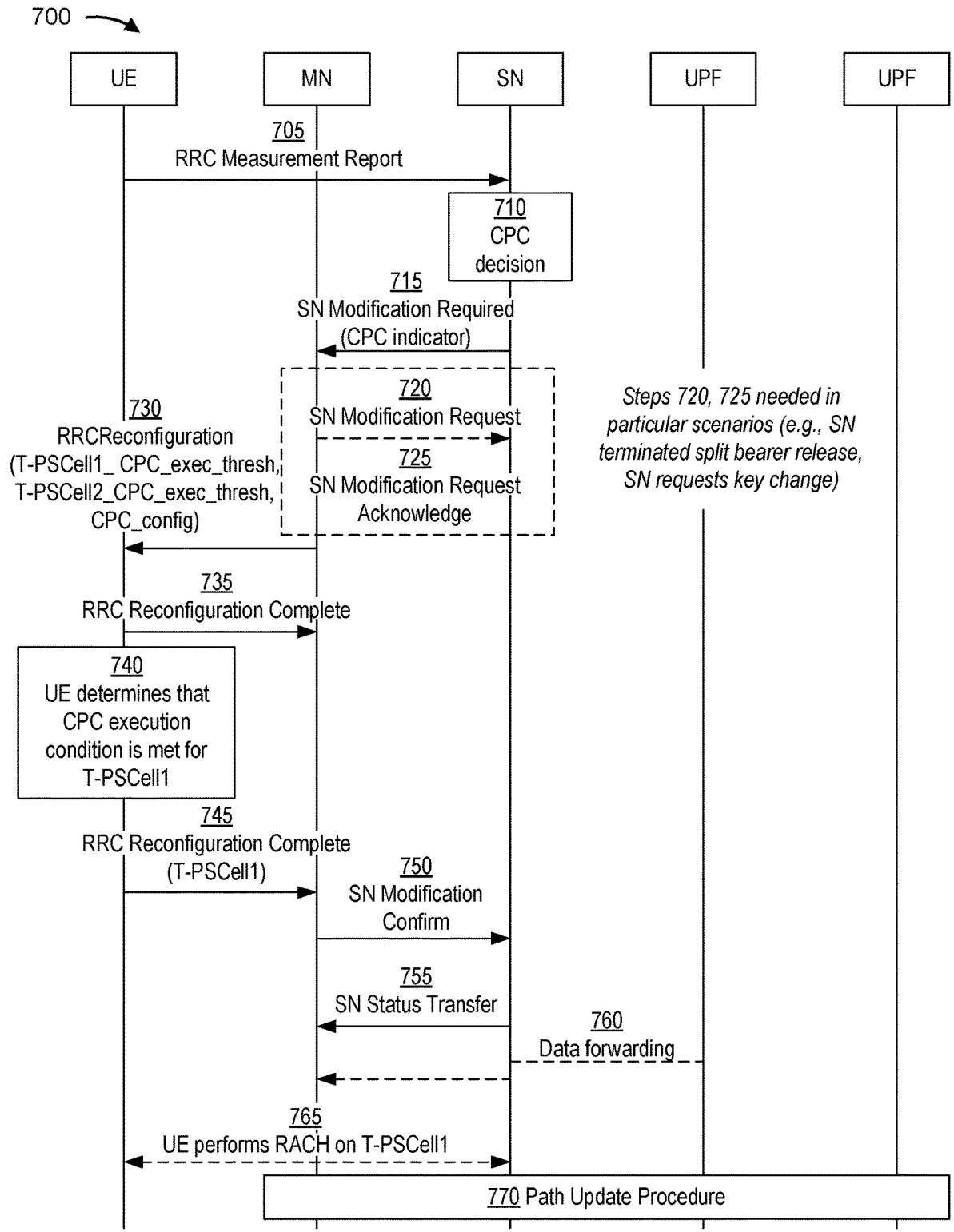
FIG. 7 is a diagram illustrating an example of an SN-initiated intra-SN conditional PSCell change with MN involvement, in accordance with the present disclosure.

FIG. 7 is a diagram illustrating an example 700 of an SN-initiated intra-SN conditional PSCell change with MN involvement. In example 700, the PSCell is being changed to a candidate target PSCell associated with the SN. That is, the conditional PSCell change is an intra-SN conditional PSCell change in example 700.

As shown by reference 705, the UE may provide, to the SN, a measurement report (e.g., an RRC measurement report). In some aspects, the measurement report may include a result of a measurement associated with the source PSCell of the UE and/or results of measurements associated with a group of candidate target PSCells.

As shown by reference 710, the SN may determine that a conditional PSCell change procedure is to be initiated based at least in part on the measurement report. For example, the SN may determine that a result of a measurement associated with the source PSCell fails to satisfy a threshold (e.g., that a signal strength associated with the source PSCell is below a signal strength threshold), and may determine that the conditional PSCell change is to be initiated.

As shown by reference 715, the SN may transmit an SN modification required message to the MN. As shown, in some aspects, the SN modification required message may include a conditional PSCell change indicator (e.g., an indication that the requested SN modification is associated with a conditional PSCell change procedure).

As shown by references 720 and 725, in some aspects, the MN may transmit an SN modification request to the SN, and the SN may transmit, to the MN, an acknowledgment of the SN modification request (e.g., an SN modification request acknowledge message).

As shown by reference 730, the MN may transmit a reconfiguration message (e.g., an RRC reconfiguration message) to the UE. As shown, in some aspects, the reconfiguration message may include configuration information associated with the conditional PSCell change. The configuration information may include, for example, information associated with each of the set of candidate target PSCells. As further shown, the reconfiguration message may include information indicating a condition for each candidate target PSCell that, if satisfied, is to cause the UE to execute the conditional PSCell change.

As shown by reference 735, the UE may receive the reconfiguration message and may provide a reconfiguration complete message (e.g., an RRC reconfiguration complete message) to the MN.

As shown by reference 740, the UE may determine that a condition for the conditional PSCell change has been satisfied for a candidate target PSCell (e.g., one of the set of candidate target PSCells). For example the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like.

As shown by reference 745, the UE may transmit a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

As shown by reference 750, the MN may transmit a confirmation message (e.g., an SN reconfiguration complete message) associated with the conditional PSCell change to the SN.

As shown by reference 755, the SN may transmit an SN status transfer message to the MN, after which data forwarding can begin, as indicated by reference 760. As shown by reference 765, the UE may perform a RACH procedure on the candidate target PSCell and, as shown by reference 770, a path update procedure may be performed.

Figure 8:
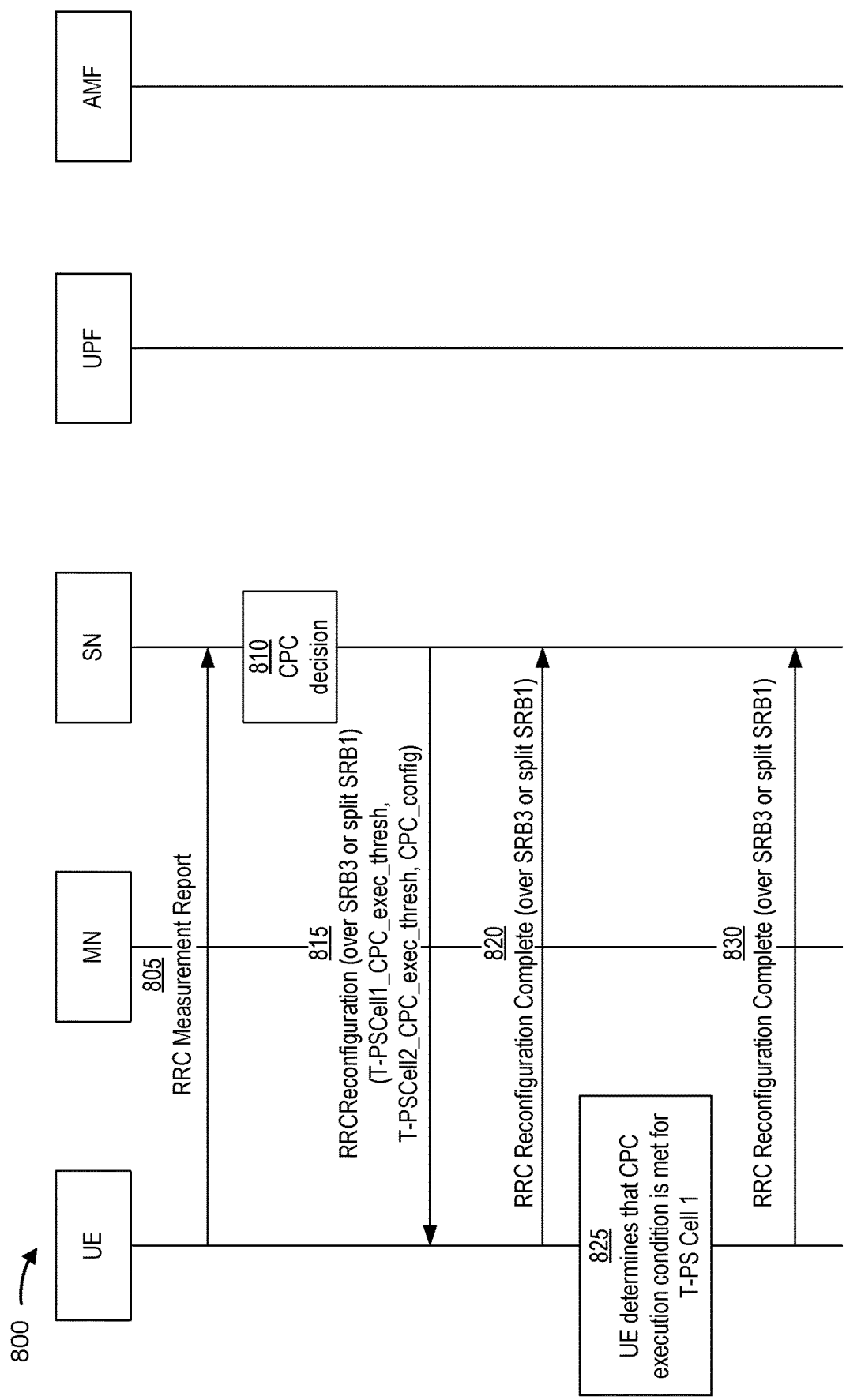
FIG. 8 is a diagram illustrating an example of an SN-initiated intra-SN conditional PSCell change without MN involvement, in accordance with the present disclosure.

FIG. 8 is a diagram illustrating an example 800 of an SN-initiated intra-SN conditional PSCell change without MN involvement. In example 800, the PSCell is being changed to a candidate target PSCell associated with the SN. That is, the conditional PSCell change is an intra-SN conditional PSCell change in example 800.

As shown by reference 805, the UE may provide, to the SN, a measurement report (e.g., an RRC measurement report). In some aspects, the measurement report may include a result of a measurement associated with the source PSCell of the UE and/or results of measurements associated with a group of candidate target PSCells.

As shown by reference 810, the SN may determine that a conditional PSCell change procedure is to be initiated based at least in part on the measurement report. For example, the SN may determine that a result of a measurement associated with the source PSCell fails to satisfy a threshold (e.g., that a signal strength associated with the source PSCell is below a signal strength threshold), and may determine that the conditional PSCell change is to be initiated.

As shown by reference 815, the SN may transmit (e.g., over SRB3 or split SRB1) a reconfiguration message (e.g., an RRC reconfiguration message) to the UE. As shown, in some aspects, the reconfiguration message may include configuration information associated with the conditional PSCell change. The configuration information may include, for example, information associated with each of the set of candidate target PSCells. As further shown, the reconfiguration message may include information indicating a condition for each candidate target PSCell that, if satisfied, is to cause the UE to execute the conditional PSCell change.

As shown by reference 820, the UE may receive the reconfiguration message and may provide (e.g., over SRB3 or split SRB1) a reconfiguration complete message (e.g., an RRC reconfiguration complete message) to the SN.

As shown by reference 825, the UE may determine that a condition for the conditional PSCell change has been satisfied for a candidate target PSCell (e.g., one of the set of candidate target PSCells). For example the UE may determine that a signal strength associated with the candidate target PSCell satisfies a threshold identified by a condition indicated for the candidate target PSCell, that the signal strength associated with the candidate target PSCell exceeds a signal strength associated with the source PSCell by a threshold amount, and/or the like.

As shown by reference 830, the UE may transmit (e.g., over SRB3 or split SRB1) a reconfiguration complete message (e.g., an RRC reconfiguration complete message) indicating that the UE has determined that the condition for the conditional PSCell change has been satisfied for the candidate target PSCell. In some aspects, the message includes information that identifies the candidate target PSCell for which the UE has determined the condition to be satisfied.

As described above, in some aspects, the UE may perform a RACH procedure on the candidate target PSCell for which the UE has determined that the condition for the conditional PSCell change has been satisfied. However, in some cases, the UE may experience a radio link failure on the MCG during performance of the RACH procedure. In some aspects, the UE may detect a radio link failure on the MCG during the performance of the RACH procedure on the target PSCell, and may perform an MCG failure information procedure after completion of the RACH procedure. In some aspects, the UE may perform the MCG failure information procedure based at least in part on the RACH procedure being completed prior to expiration of a timer associated with the RACH procedure. In some aspects, performing the MCG failure information procedure may reduce a recovery delay (e.g., as compared to an RRC re-establishment procedure) and may enable data flows established on the SN to be continued (which is not possible during the RRC re-establishment procedure). In some aspects, if the timer expires before the UE completes the RACH procedure, the UE may perform an RRC re-establishment procedure.

As indicated above, FIGS. 3A, 3B, 4A, 4B, 5A, 5B, 6, 7, and 8 are provided as examples. Other examples may differ from what is described with respect to FIGS. 3A, 3B, 4A, 4B, 5A, 5B, 6, 7, and 8.

Figure 9:
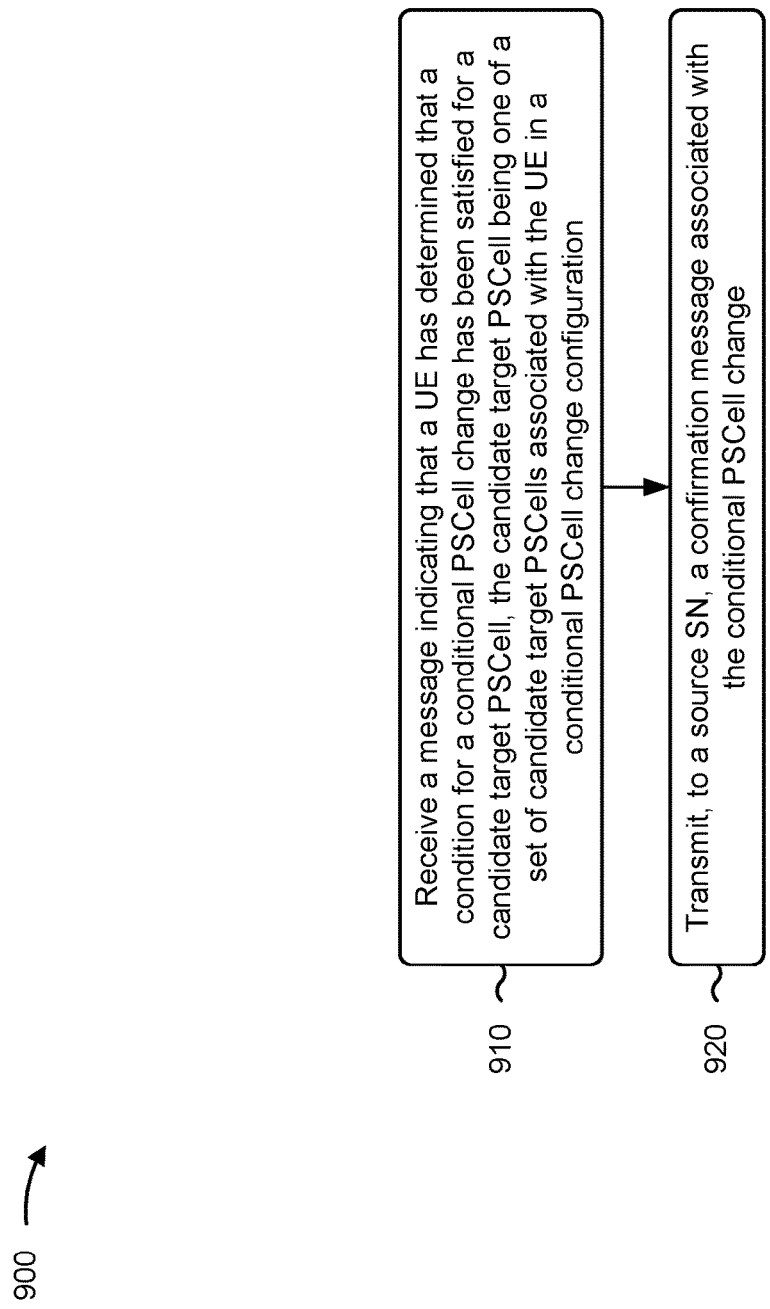
FIG. 9 is a diagram illustrating an example process performed, for example, by a master node, in accordance with the present disclosure.

FIG. 9 is a diagram illustrating an example process 900 performed, for example, by an MN, in accordance with the present disclosure. Example process 900 is an example where the MN (e.g., a base station 110 and/or the like) performs operations associated with signaling aspects of a conditional PSCell change procedure in MR-DC.

As shown in FIG. 9, in some aspects, process 900 may include receiving a message indicating that a UE has determined that a condition for a conditional PSCell change has been satisfied for a candidate target PSCell, the candidate target PSCell being one of a set of candidate target PSCells associated with the UE in a conditional PSCell change configuration (block 910). For example, the MN (e.g., using transmit processor 220, receive processor 238, controller/processor 240, memory 242, and/or the like) may receive a message indicating that a UE (e.g., a UE 120) has determined that a condition for a conditional PSCell change has been satisfied for a candidate target PSCell, as described above. In some aspects, the candidate target PSCell is one of a set of candidate target PSCells associated with the UE in a conditional PSCell change configuration.

As further shown in FIG. 9, in some aspects, process 900 may include transmitting, to a source SN, a confirmation message associated with the conditional PSCell change (block 920). For example, the MN (e.g., using transmit processor 220, controller/processor 240, memory 242, and/or the like) may transmit, to a source SN (e.g., a base station 110), a confirmation message associated with the conditional PSCell change, as described above.

Process 900 may include additional aspects, such as any single aspect or any combination of aspects described below and/or in connection with one or more other processes described elsewhere herein.

In a first aspect, the MN and the source SN are nodes in a multi-radio access technology dual connectivity configuration.

In a second aspect, alone or in combination with the first aspect, the confirmation message includes a data forwarding address of a target SN associated with the candidate target PSCell.

In a third aspect, alone or in combination with one or more of the first and second aspects, the candidate target PSCell is a first candidate target PSCell associated with a first target SN, and process 900 further includes transmitting, to a second target SN, a request to release reserved resources of a second candidate target PSCell associated with the second target SN, the second candidate target PSCell being one of the set of candidate target PSCells.

In a fourth aspect, alone or in combination with one or more of the first through third aspects, the request includes a list of candidate target PSCells for which reserved resources are to be released at the second target SN, the list of candidate target PSCells including the second candidate target PSCell.

In a fifth aspect, alone or in combination with one or more of the first through fourth aspects, the confirmation message is an SN change confirm message.

In a sixth aspect, alone or in combination with one or more of the first through fifth aspects, the confirmation message is an SN release request message.

In a seventh aspect, alone or in combination with one or more of the first through sixth aspects, the conditional PSCell change is associated with an SN-initiated conditional PSCell change procedure.

In an eighth aspect, alone or in combination with one or more of the first through seventh aspects, the conditional PSCell change is associated with an SN-initiated intra-SN conditional PSCell change procedure having MN involvement.

In a ninth aspect, alone or in combination with one or more of the first through eighth aspects, process 900 includes receiving, from the source SN, an indication that a conditional PSCell change procedure is being initiated.

In a tenth aspect, alone or in combination with one or more of the first through ninth aspects, the indication is included in a change message that further includes information that identifies a set of target SNs.

In an eleventh aspect, alone or in combination with one or more of the first through tenth aspects, the indication is included in a modification message that further includes a conditional PSCell change indicator.

In a twelfth aspect, alone or in combination with one or more of the first through eleventh aspects, the conditional PSCell change is associated with an MN-initiated conditional PSCell change procedure.

In a thirteenth aspect, alone or in combination with one or more of the first through twelfth aspects, the conditional PSCell change is associated with an MN-initiated intra-SN conditional PSCell change procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
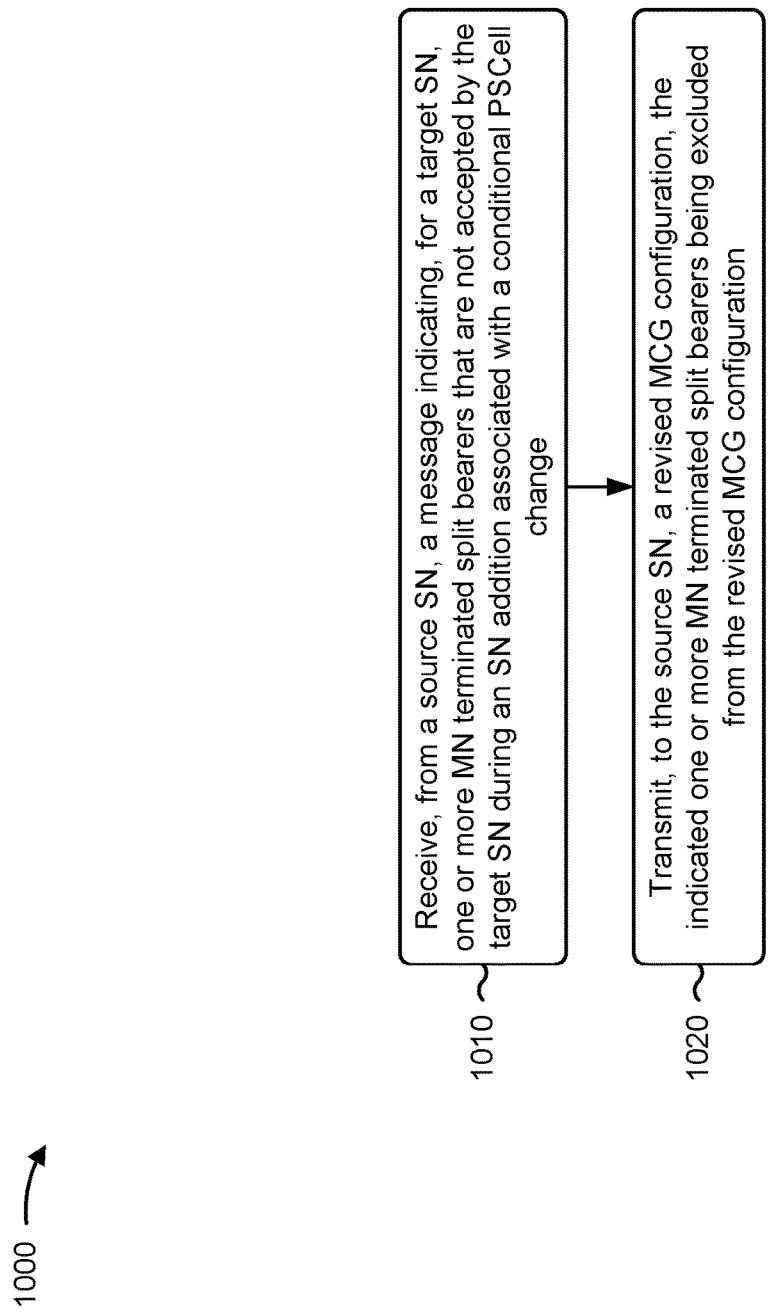
FIG. 10 is a diagram illustrating an example process performed, for example, by a master node, in accordance with the present disclosure.

FIG. 10 is a diagram illustrating an example process 1000 performed, for example, by an MN, in accordance with the present disclosure. Example process 1000 is an example where the MN (e.g., a base station 110 and/or the like) performs operations associated with signaling aspects of a conditional PSCell change procedure in MR-DC.

As shown in FIG. 10, in some aspects, process 1000 may include receiving, from a source SN, a message indicating, for a target SN, one or more MN terminated split bearers that are not accepted by the target SN during an SN addition associated with a conditional PSCell change (block 1010). For example, the MN (e.g., using receive processor 238, controller/processor 240, memory 242, and/or the like) may receive, from a source SN (e.g., a base station 110), a message indicating, for a target SN (e.g., a base station 110), one or more MN terminated split bearers that are not accepted by the target SN during an SN addition associated with a conditional PSCell change, as described above.

As further shown in FIG. 10, in some aspects, process 1000 may include transmitting, to the source SN, a revised MCG configuration, the indicated one or more MN terminated split bearers being excluded from the revised MCG configuration (block 1020). For example, the MN (e.g., using transmit processor 220, controller/processor 240, memory 242, and/or the like) may transmit, to the source SN, a revised MCG configuration, the indicated one or more MN terminated split bearers being excluded from the revised MCG configuration, as described above.

Process 1000 may include additional aspects, such as any single aspect or any combination of aspects described below and/or in connection with one or more other processes described elsewhere herein.

In a first aspect, the conditional PSCell change is associated with an SN-initiated and SN-executed conditional PSCell change procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
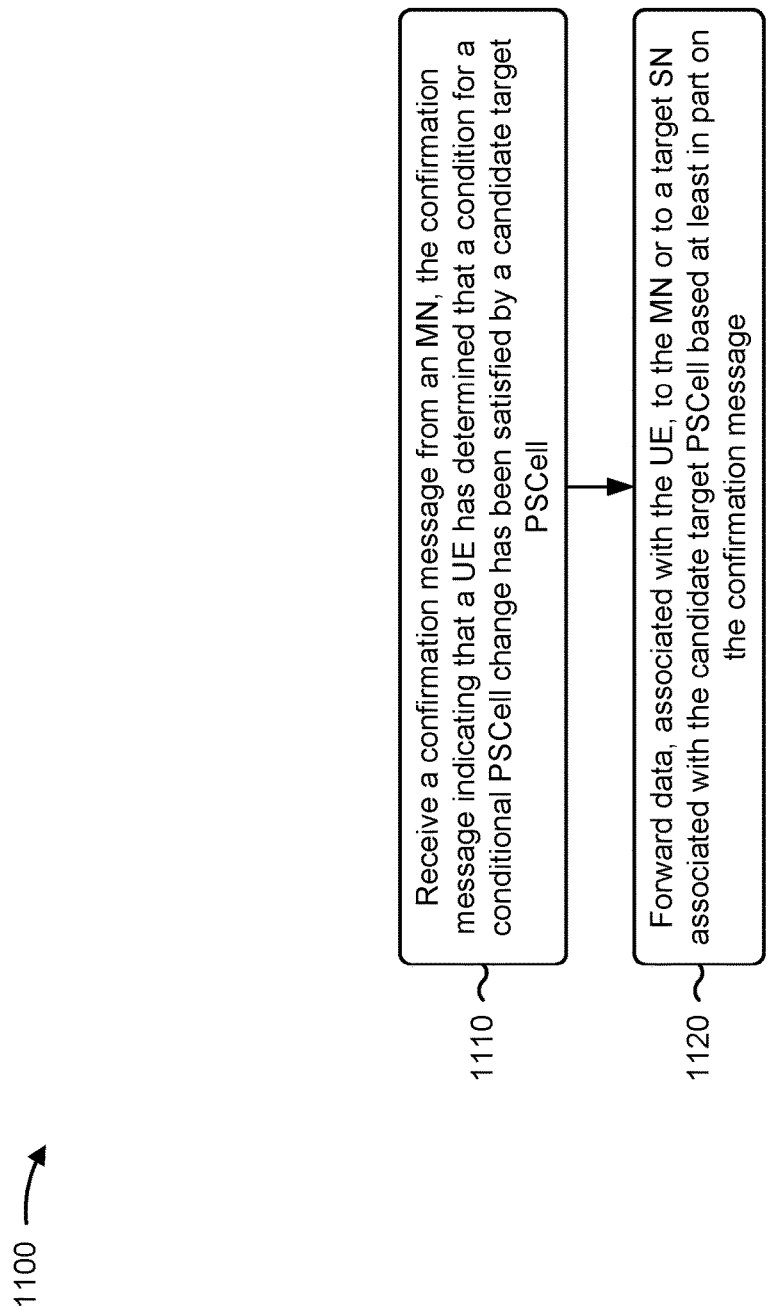
FIG. 11 is a diagram illustrating an example process performed, for example, by a source secondary node, in accordance with the present disclosure.

FIG. 11 is a diagram illustrating an example process 1100 performed, for example, by a source SN, in accordance with the present disclosure. Example process 1100 is an example where the source SN (e.g., a base station 110 and/or the like) performs operations associated with signaling aspects of a conditional PSCell change procedure in MR-DC.

As shown in FIG. 11, in some aspects, process 1100 may include receiving a confirmation message from an MN, the confirmation message indicating that a UE has determined that a condition for a conditional PSCell change has been satisfied by a candidate target PSCell (block 1110). For example, the source SN (e.g., using receive processor 238, controller/processor 240, memory 242, and/or the like) may receive a confirmation message from an MN (e.g., a base station 110), the confirmation message indicating that a UE (e.g., a UE 120) has determined that a condition for a conditional PSCell change has been satisfied by a candidate target PSCell, as described above.

As further shown in FIG. 11, in some aspects, process 1100 may include forwarding data, associated with the UE, to the MN or to a target SN associated with the candidate target PSCell based at least in part on the confirmation message (block 1120). For example, the base station (e.g., using transmit processor 220, receive processor 238, controller/processor 240, memory 242, and/or the like) may forward data, associated with the UE, to the MN or to a target SN associated with the candidate target PSCell based at least in part on the confirmation message, as described above.

Process 1100 may include additional aspects, such as any single aspect or any combination of aspects described below and/or in connection with one or more other processes described elsewhere herein.

In a first aspect, the confirmation message includes a data forwarding address of the target SN associated with the candidate target PSCell.

In a second aspect, alone or in combination with the first aspect, the confirmation message is an SN change confirm message.

In a third aspect, alone or in combination with one or more of the first and second aspects, the confirmation message is an SN release request message.

In a fourth aspect, alone or in combination with one or more of the first through third aspects, the conditional PSCell change is associated with an SN-initiated conditional PSCell change procedure.

In a fifth aspect, alone or in combination with one or more of the first through fourth aspects, the conditional PSCell change is associated with an SN-initiated intra-SN conditional PSCell change procedure having MN involvement.

In a sixth aspect, alone or in combination with one or more of the first through fifth aspects, process 1100 includes transmitting an indication that a conditional PSCell change procedure is being initiated.

In a seventh aspect, alone or in combination with one or more of the first through sixth aspects, the indication is included in a change message that further includes information that identifies a set of target SNs, the set of target SNs including the target SN.

In an eighth aspect, alone or in combination with one or more of the first through seventh aspects, the indication is included in a modification message that further includes a conditional PSCell change indicator.

In a ninth aspect, alone or in combination with one or more of the first through eighth aspects, the indication is included in an addition request message that further includes a conditional PSCell change indicator.

In a tenth aspect, alone or in combination with one or more of the first through ninth aspects, the conditional PSCell change is associated with an MN-initiated conditional PSCell change procedure.

In an eleventh aspect, alone or in combination with one or more of the first through tenth aspects, the conditional PSCell change is associated with an SN-initiated and SN-executed conditional PSCell change procedure.

In a twelfth aspect, alone or in combination with one or more of the first through eleventh aspects, process 1100 includes receiving, from the target SN, information identifying one or more MN terminated split bearers that are not accepted by the target SN during an SN addition associated with the conditional PSCell change; and transmitting, to the MN, a message indicating the indicated one or more MN terminated split bearers.

In a thirteenth aspect, alone or in combination with one or more of the first through twelfth aspects, process 1100 includes receiving, from the MN, a revised MCG configuration, the indicated one or more MN terminated split bearers being excluded from the revised MCG configuration.

In a fourteenth aspect, alone or in combination with one or more of the first through thirteenth aspects, process 1100 includes transmitting, to the UE a reconfiguration message including a conditional PSCell change configuration, the conditional PSCell change configuration including the revised MCG configuration and a secondary cell group configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
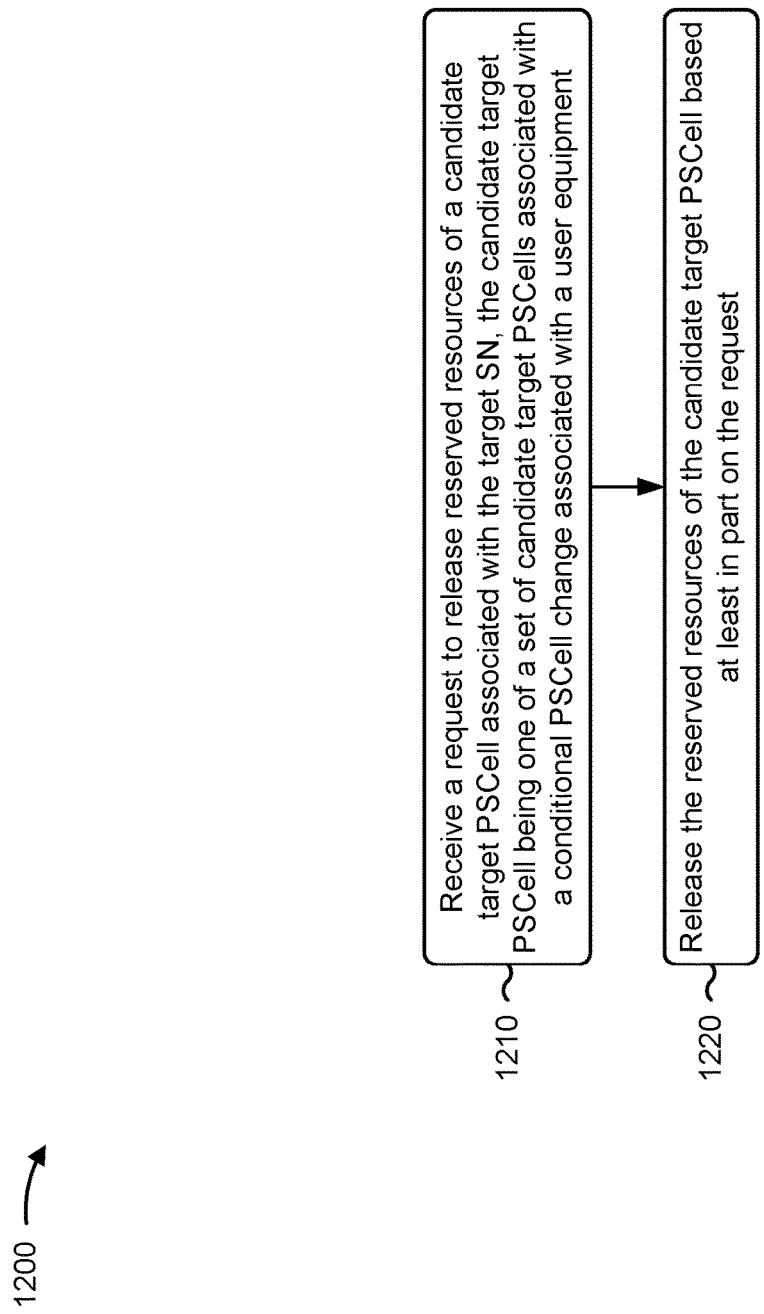
FIG. 12 is a diagram illustrating an example process performed, for example, by a target secondary node, in accordance with the present disclosure.

FIG. 12 is a diagram illustrating an example process 1200 performed, for example, by a target SN, in accordance with the present disclosure. Example process 1200 is an example where the target SN (e.g., a base station 110 and/or the like) performs operations associated with signaling aspects of a conditional PSCell change procedure in MR-DC.

As shown in FIG. 12, in some aspects, process 1200 may include receiving a request to release reserved resources of a candidate target PSCell associated with the target SN, the candidate target PSCell being one of a set of candidate target PSCells associated with a conditional PSCell change associated with a UE (block 1210). For example, the target SN (e.g., using receive processor 238, controller/processor 240, memory 242, and/or the like) may receive a request to release reserved resources of a candidate target PSCell associated with the target SN, as described above. In some aspects, the candidate target PSCell is one of a set of candidate target PSCells associated with a conditional PSCell change associated with a UE (e.g., a UE 120).

As further shown in FIG. 12, in some aspects, process 1200 may include releasing the reserved resources of the candidate target PSCell based at least in part on the request (block 1220). For example, the target SN (e.g., using transmit processor 220, receive processor 238, controller/processor 240, memory 242, and/or the like) may release the reserved resources of the candidate target PSCell based at least in part on the request, as described above.

Process 1200 may include additional aspects, such as any single aspect or any combination of aspects described below and/or in connection with one or more other processes described elsewhere herein.

In a first aspect, the request identifies a set of candidate target PSCells for which reserved resources are to be released, the candidate target PSCell being included in the set of candidate target PSCells.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
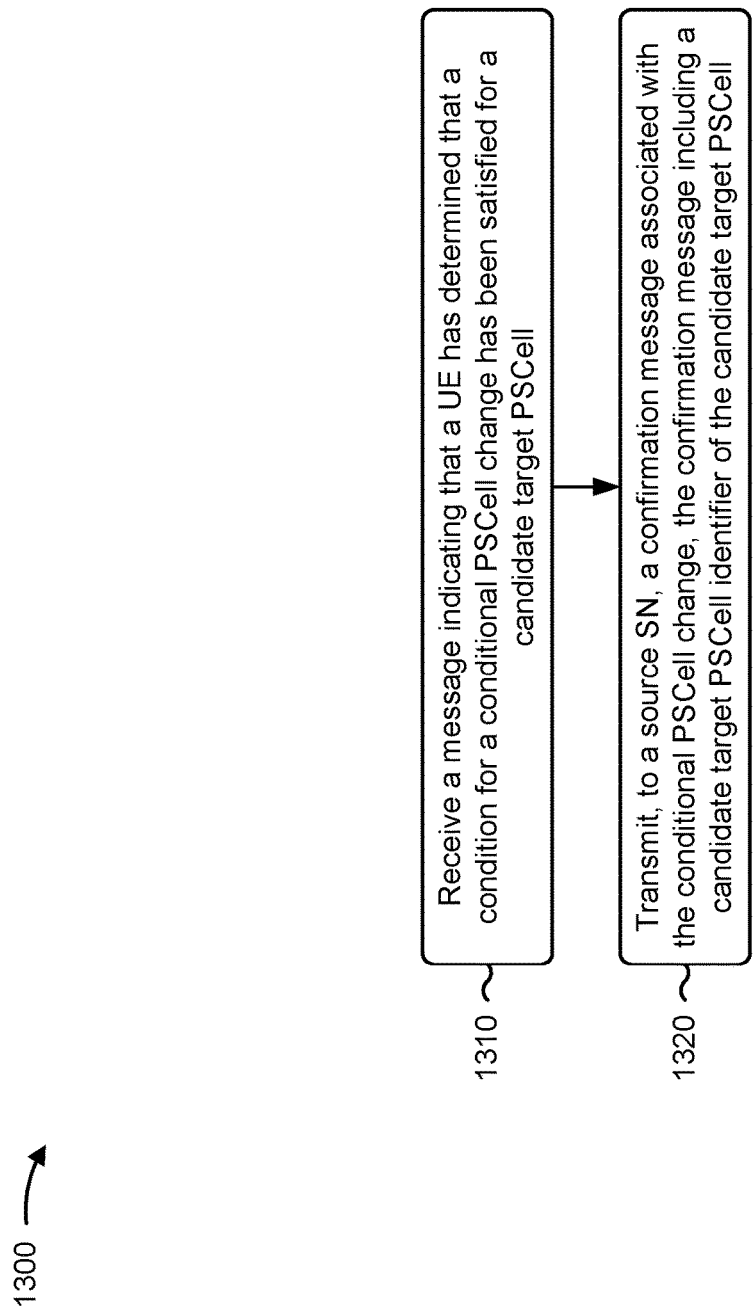
FIG. 13 is a diagram illustrating an example process performed, for example, by a target secondary node, in accordance with the present disclosure.

FIG. 13 is a diagram illustrating an example process 1300 performed, for example, by a target SN, in accordance with the present disclosure. Example process 1300 is an example where the target SN (e.g., a base station 110 and/or the like) performs operations associated with signaling aspects of a conditional PSCell change procedure in MR-DC.

As shown in FIG. 13, in some aspects, process 1300 may include receiving a message indicating that a UE has determined that a condition for a conditional PSCell change has been satisfied for a candidate target PSCell (block 1310). For example, the target SN (e.g., using receive processor 238, controller/processor 240, memory 242, and/or the like) may receive a message indicating that a UE (e.g., a UE 120) has determined that a condition for a conditional PSCell change has been satisfied for a candidate target PSCell, as described above.

As further shown in FIG. 13, in some aspects, process 1300 may include transmitting, to a source SN, a confirmation message associated with the conditional PSCell change, the confirmation message including a candidate target PSCell identifier of the candidate target PSCell (block 1320). For example, the target SN station (e.g., using transmit processor 220, controller/processor 240, memory 242, and/or the like) may transmit, to a source SN (e.g., a base station 110), a confirmation message associated with the conditional PSCell change, the confirmation message including a candidate target PSCell identifier of the candidate target PSCell, as described above.

Process 1300 may include additional aspects, such as any single aspect or any combination of aspects described below and/or in connection with one or more other processes described elsewhere herein.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
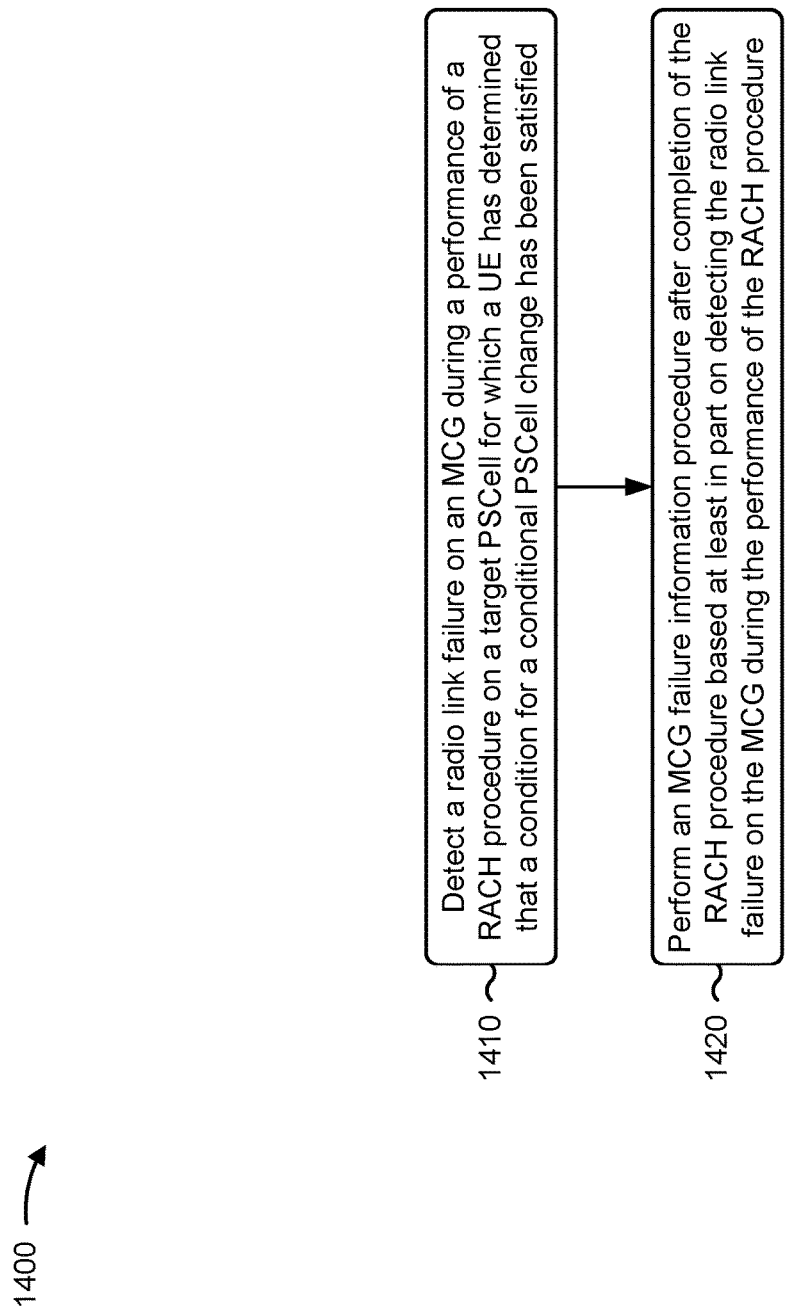
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120 and/or the like) performs operations associated with signaling aspects of a conditional PSCell change procedure in MR-DC.

As shown in FIG. 14, in some aspects, process 1400 may include detecting a radio link failure on an MCG during a performance of a RACH procedure on a target PSCell for which the UE has determined that a condition for a conditional PSCell change has been satisfied (block 1410). For example, the UE (e.g., using receive processor 258, transmit processor 264, controller/processor 280, memory 282, and/or the like) may detect a radio link failure on an MCG during a performance of a RACH procedure on a target PSCell for which the UE has determined that a condition for a conditional PSCell change has been satisfied, as described above.

As further shown in FIG. 14, in some aspects, process 1400 may include performing an MCG failure information procedure after completion of the RACH procedure based at least in part on detecting the radio link failure on the MCG during the performance of the RACH procedure (block 1420). For example, the UE (e.g., using receive processor 258, transmit processor 264, controller/processor 280, memory 282, and/or the like) may perform an MCG failure information procedure after completion of the RACH procedure based at least in part on detecting the radio link failure on the MCG during the performance of the RACH procedure, as described above.

Process 1400 may include additional aspects, such as any single aspect or any combination of aspects described below and/or in connection with one or more other processes described elsewhere herein.

In one aspect, the MCG failure information procedure is performed based at least in part on the RACH procedure being completed prior to expiration of a timer associated with the RACH procedure.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The following provides an overview of some Aspects of the present disclosure:

Aspect 1: A method of wireless communication performed by an MN, comprising: receiving a message indicating that a UE has determined that a condition for a conditional PSCell change has been satisfied for a candidate target PSCell, the candidate target PSCell being one of a set of candidate target PSCells associated with the UE in a conditional PSCell change configuration; and transmitting, to a source SN, a confirmation message associated with the conditional PSCell change.

Aspect 2: The method of Aspect 1, wherein the MN and the source SN are nodes in a multi-radio access technology dual connectivity configuration.

Aspect 3: The method of any of Aspects 1-2, wherein the confirmation message includes a data forwarding address of a target SN associated with the candidate target PSCell.

Aspect 4: The method of any of Aspects 1-3, wherein the candidate target PSCell is a first candidate target PSCell associated with a first target SN, and wherein the method further comprises: transmitting, to a second target SN, a request to release reserved resources of a second candidate target PSCell associated with the second target SN, the second candidate target PSCell being one of the set of candidate target PSCells.

Aspect 5: The method of Aspect 4, wherein the request includes a list of candidate target PSCells for which reserved resources are to be released at the second target SN, the list of candidate target PSCells including the second candidate target PSCell.

Aspect 6: The method of any of Aspects 1-5, wherein the confirmation message is an SN change confirm message.

Aspect 7: The method of any of Aspects 1-5, wherein the confirmation message is an SN release request message.

Aspect 8: The method of any of Aspects 1-7, wherein the conditional PSCell change is associated with an SN-initiated conditional PSCell change procedure.

Aspect 9: The method of any of Aspects 1-7, wherein the conditional PSCell change is associated with an SN-initiated intra-SN conditional PSCell change procedure having MN involvement.

Aspect 10: The method of any of Aspects 1-9, further comprising receiving, from the source SN, an indication that a conditional PSCell change procedure is being initiated.

Aspect 11: The method of Aspect 10, wherein the indication is included in a change message that further includes information that identifies a set of target SNs.

Aspect 12: The method of Aspect 10, wherein the indication is included in a modification message that further includes a conditional PSCell change indicator.

Aspect 13: The method of any of Aspects 1-7 or 10-12, wherein the conditional PSCell change is associated with an MN-initiated conditional PSCell change procedure.

Aspect 14: The method of any of Aspects 1-7 or 10-12, wherein the conditional PSCell change is associated with an MN-initiated intra-SN conditional PSCell change procedure.

Aspect 15: A method of wireless communication performed by an MN, comprising: receiving, from a source SN, a message indicating, for a target SN, one or more MN terminated split bearers that are not accepted by the target SN during an SN addition associated with a conditional PSCell change; and transmitting, to the source SN, a revised MCG configuration, the indicated one or more MN terminated split bearers being excluded from the revised MCG configuration.

Aspect 16: The method of Aspect 15, wherein the conditional PSCell change is associated with an SN-initiated and SN-executed conditional PSCell change procedure.

Aspect 17: A method of wireless communication performed by a source SN, comprising: receiving a confirmation message from a MN, the confirmation message indicating that a UE has determined that a condition for a conditional PSCell change has been satisfied by a candidate target PSCell; and forwarding data, associated with the UE, to the MN or to a target SN associated with the candidate target PSCell based at least in part on the confirmation message.

Aspect 18: The method of Aspect 17, wherein the confirmation message includes a data forwarding address of the target SN associated with the candidate target PSCell.

Aspect 19: The method of any of Aspects 17-18, wherein the confirmation message is an SN change confirm message.

Aspect 20: The method of any of Aspects 17-18, wherein the confirmation message is an SN release request message.

Aspect 21: The method of any of Aspects 17-20, wherein the conditional PSCell change is associated with an SN-initiated conditional PSCell change procedure.

Aspect 22: The method of any of Aspects 17-20, wherein the conditional PSCell change is associated with an SN-initiated intra-SN conditional PSCell change procedure having MN involvement.

Aspect 23: The method of any of Aspects 17-22, further comprising transmitting an indication that a conditional PSCell change procedure is being initiated.

Aspect 24: The method of Aspect 23, wherein the indication is included in a change message that further includes information that identifies a set of target SNs, the set of target SNs including the target SN.

Aspect 25: The method of Aspect 23, wherein the indication is included in a modification message that further includes a conditional PSCell change indicator.

Aspect 26: The method of Aspect 23, wherein the indication is included in an addition request message that further includes a conditional PSCell change indicator.

Aspect 27: The method of any of Aspects 17-20 or 23-26, wherein the conditional PSCell change is associated with an MN-initiated conditional PSCell change procedure.

Aspect 28: The method of any of Aspects 17-20 or 23-26, wherein the conditional PSCell change is associated with an SN-initiated and SN-executed conditional PSCell change procedure.

Aspect 29: The method of any of Aspects 17-28, further comprising receiving, from the target SN, information identifying one or more MN terminated split bearers that are not accepted by the target SN during an SN addition associated with the conditional PSCell change; and transmitting, to the MN, a message indicating the indicated one or more MN terminated split bearers.

Aspect 30: The method of Aspect 29, further comprising receiving, from the MN, a revised MCG configuration, the indicated one or more MN terminated split bearers being excluded from the revised MCG configuration.

Aspect 31: The method of Aspect 30, further comprising transmitting, to the UE, a reconfiguration message including a conditional PSCell change configuration, the conditional PSCell change configuration including the revised MCG configuration and a secondary cell group configuration.

Aspect 32: A method of wireless communication performed by a target SN, comprising: receiving a request to release reserved resources of a candidate target PSCell associated with the target SN, the candidate target PSCell being one of a set of candidate target PSCells associated with a conditional PSCell change associated with a user equipment; and releasing the reserved resources of the candidate target PSCell based at least in part on the request.

Aspect 33: The method of Aspect 32, wherein the request identifies a set of candidate target PSCells for which reserved resources are to be released, the candidate target PSCell being included in the set of candidate target PSCells.

Aspect 34: A method of wireless communication performed by a target SN, comprising: receiving a message indicating that a UE has determined that a condition for a conditional PSCell change has been satisfied for a candidate target PSCell; and transmitting, to a source SN, a confirmation message associated with the conditional PSCell change, the confirmation message including a candidate target PSCell identifier of the candidate target PSCell.

Aspect 35: A method of wireless communication performed by a UE, comprising: detecting a radio link failure on a MCG during a performance of a RACH procedure on a target PSCell for which the UE has determined that a condition for a conditional PSCell change has been satisfied; and performing an MCG failure information procedure after completion of the RACH procedure based at least in part on detecting the radio link failure on the MCG during the performance of the RACH procedure.

Aspect 36: The method of Aspect 35, wherein the MCG failure information procedure is performed based at least in part on the RACH procedure being completed prior to expiration of a timer associated with the RACH procedure.

Aspect 37: An apparatus for wireless communication at a device, comprising a processor; memory coupled with the processor; and instructions stored in the memory and executable by the processor to cause the apparatus to perform the method of one or more Aspects of Aspects 1-14.

Aspect 38: A device for wireless communication, comprising a memory and one or more processors coupled to the memory, the memory and the one or more processors configured to perform the method of one or more Aspects of Aspects 1-14.

Aspect 39: An apparatus for wireless communication, comprising at least one means for performing the method of one or more Aspects of Aspects 1-14.

Aspect 40: A non-transitory computer-readable medium storing code for wireless communication, the code comprising instructions executable by a processor to perform the method of one or more Aspects of Aspects 1-14.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 42: An apparatus for wireless communication at a device, comprising a processor; memory coupled with the processor; and instructions stored in the memory and executable by the processor to cause the apparatus to perform the method of one or more Aspects of Aspects 15-16.

Aspect 43: A device for wireless communication, comprising a memory and one or more processors coupled to the memory, the memory and the one or more processors configured to perform the method of one or more Aspects of Aspects 15-16.

Aspect 44: An apparatus for wireless communication, comprising at least one means for performing the method of one or more Aspects of Aspects 15-16.

Aspect 45: A non-transitory computer-readable medium storing code for wireless communication, the code comprising instructions executable by a processor to perform the method of one or more Aspects of Aspects 15-16.

Aspect 46: A non-transitory computer-readable medium storing a set of instructions for wireless communication, the set of instructions comprising one or more instructions that, when executed by one or more processors of a device, cause the device to perform the method of one or more Aspects of Aspects 15-16.

Aspect 47: An apparatus for wireless communication at a device, comprising a processor; memory coupled with the processor; and instructions stored in the memory and executable by the processor to cause the apparatus to perform the method of one or more Aspects of Aspects 17-31.

Aspect 48: A device for wireless communication, comprising a memory and one or more processors coupled to the memory, the memory and the one or more processors configured to perform the method of one or more Aspects of Aspects 17-31.

Aspect 49: An apparatus for wireless communication, comprising at least one means for performing the method of one or more Aspects of Aspects 17-31.

Aspect 50: A non-transitory computer-readable medium storing code for wireless communication, the code comprising instructions executable by a processor to perform the method of one or more Aspects of Aspects 17-31.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 17-31.

Aspect 52: An apparatus for wireless communication at a device, comprising a processor; memory coupled with the processor; and instructions stored in the memory and executable by the processor to cause the apparatus to perform the method of one or more Aspects of Aspects 32-33.

Aspect 53: A device for wireless communication, comprising a memory and one or more processors coupled to the memory, the memory and the one or more processors configured to perform the method of one or more Aspects of Aspects 32-33.

Aspect 54: An apparatus for wireless communication, comprising at least one means for performing the method of one or more Aspects of Aspects 32-33.

Aspect 55: A non-transitory computer-readable medium storing code for wireless communication, the code comprising instructions executable by a processor to perform the method of one or more Aspects of Aspects 32-33.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 32-33.

Aspect 57: An apparatus for wireless communication at a device, comprising a processor; memory coupled with the processor; and instructions stored in the memory and executable by the processor to cause the apparatus to perform the method of Aspect 34.

Aspect 58: A device for wireless communication, comprising a memory and one or more processors coupled to the memory, the memory and the one or more processors configured to perform the method of Aspect 34.

Aspect 69: An apparatus for wireless communication, comprising at least one means for performing the method of Aspect 34.

Aspect 60: A non-transitory computer-readable medium storing code for wireless communication, the code comprising instructions executable by a processor to perform the method of Aspect 34.

Aspect 61: A non-transitory computer-readable medium storing a set of instructions for wireless communication, the set of instructions comprising one or more instructions that, when executed by one or more processors of a device, cause the device to perform the method of Aspect 34.

Aspect 62: An apparatus for wireless communication at a device, comprising a processor; memory coupled with the processor; and instructions stored in the memory and executable by the processor to cause the apparatus to perform the method of one or more Aspects of Aspects 35-36.

Aspect 63: A device for wireless communication, comprising a memory and one or more processors coupled to the memory, the memory and the one or more processors configured to perform the method of one or more Aspects of Aspects 35-36.

Aspect 64: An apparatus for wireless communication, comprising at least one means for performing the method of one or more Aspects of Aspects 1-36.

Aspect 65: A non-transitory computer-readable medium storing code for wireless communication, the code comprising instructions executable by a processor to perform the method of one or more Aspects of Aspects 35-36.

Aspect 66: A non-transitory computer-readable medium storing a set of instructions for wireless communication, the set of instructions comprising one or more instructions that, when executed by one or more processors of a device, cause the device to perform the method of one or more Aspects of Aspects 35-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A master node (MN) for wireless communication, comprising:
    a memory; and
    one or more processors coupled to the memory, the one or more processors configured to:
    receive, from a source secondary node (SN) or from a set of target SNs, information that identifies the set of target SNs;
    receive a message indicating that a user equipment (UE) has determined that a condition for a conditional primary secondary cell (PSCell) change has been satisfied for a candidate target PSCell,
    the candidate target PSCell being one of a set of candidate target PSCells associated with the UE in a conditional PSCell change configuration; and
    transmit, to the sourse SN, a confirmation message associated with the conditional PSCell change.

2. The MN of claim 1, wherein the MN and the source SN are nodes in a multi-radio access technology dual connectivity configuration.

3. The MN of claim 1, wherein the confirmation message includes a data forwarding address of a target SN associated with the candidate target PSCell.

4. The MN of claim 1, wherein the candidate target PSCell is a first candidate target PSCell associated with a first target SN, and wherein the one or more processors are further configured to:
    transmit, to a second target SN, a request to release reserved resources of a second candidate target PSCell associated with the second target SN, the second candidate target PSCell being one of the set of candidate target PSCells.

5. The MN of claim 4, wherein the request includes a list of candidate target PSCells for which reserved resources are to be released at the second target SN, the list of candidate target PSCells including the second candidate target PSCell.

6. The MN of claim 1, wherein the confirmation message is an SN change confirm message.

7. The MN of claim 1, wherein the confirmation message is an SN release request message.

8. The MN of claim 1, wherein the conditional PSCell change is associated with an SN-initiated conditional PSCell change procedure.

9. The MN of claim 1, wherein the conditional PSCell change is associated with an SN-initiated intra-SN conditional PSCell change procedure having MN involvement.

10. The MN of claim 1, wherein the one or more processors are further configured to receive, from the source SN, an indication that a conditional PSCell change procedure is being initiated.

11. The MN of claim 10, wherein the indication is included in a change message that further includes the information that identifies the set of target SNs.

12. The MN of claim 10, wherein the indication is included in a modification message that further includes a conditional PSCell change indicator.

13. The MN of claim 1, wherein the conditional PSCell change is associated with an MN-initiated conditional PSCell change procedure.

14. The MN of claim 1, wherein the conditional PSCell change is associated with an MN-initiated intra-SN conditional PSCell change procedure.

15. A source secondary node (SN) for wireless communication, comprising:
    a memory; and
    one or more processors coupled to the memory, the one or more processors configured to:
    transmit, to a master node (MN), information that identifies a set of target SNs;
    receive a confirmation message from the MN, the confirmation message indicating that a user equipment (UE) has determined that a condition for a conditional primary secondary cell (PSCell) change has been satisfied by a candidate target PSCell; and
    forward data, associated with the UE, to the MN or to a target SN of the set of target SNs associated with the candidate target PSCell based at least in part on the confirmation message.

16. The source SN of claim 15, wherein the confirmation message includes a data forwarding address of the target SN associated with the candidate target PSCell.

17. The source SN of claim 15, wherein the confirmation message is an SN change confirm message.

18. The source SN of claim 15, wherein the confirmation message is an SN release request message.

19. The source SN of claim 15, wherein the conditional PSCell change is associated with an SN-initiated conditional PSCell change procedure.

20. The source SN of claim 15, wherein the conditional PSCell change is associated with an SN-initiated intra-SN conditional PSCell change procedure having MN involvement.

21. The source SN of claim 15, wherein the one or more processors are further configured to transmit an indication that a conditional PSCell change procedure is being initiated.

22. The source SN of claim 21, wherein the indication is included in a change message that further includes the information that identifies the set of target SNs.

23. The source SN of claim 21, wherein the indication is included in a modification message that further includes a conditional PSCell change indicator.

24. The source SN of claim 21, wherein the indication is included in an addition request message that further includes a conditional PSCell change indicator.

25. The source SN of claim 15, wherein the conditional PSCell change is associated with an MN-initiated conditional PSCell change procedure or is associated with an SN-initiated and SN-executed conditional PSCell change procedure.

26. The source SN of claim 15, wherein the one or more processors are further configured to:
   receive, from the target SN, information identifying one or more MN terminated split bearers that are not accepted by the target SN during an SN addition associated with the conditional PSCell change; and
   transmit, to the MN, a message indicating the one or more MN terminated split bearers.

27. The source SN of claim 26, wherein the one or more processors are further configured to:
   receive, from the MN, a revised master cell group (MCG) configuration, the one or more MN terminated split bearers being excluded from the revised MCG configuration; and
   transmit, to the UE, a reconfiguration message including a conditional PSCell change configuration, the conditional PSCell change configuration including the revised MCG configuration and a secondary cell group configuration.

28. A method of wireless communication performed by a target secondary node (SN), comprising:
   receiving a message indicating that a user equipment (UE) has determined that a condition for a conditional primary secondary cell (PSCell) change has been satisfied for a candidate target PSCell;
   transmitting, to a source SN, a confirmation message associated with the conditional PSCell change, the confirmation message including a candidate target PSCell identifier of the candidate target PSCell; and
   transmitting, to the source SN, information identifying one or more master node (MN) terminated split bearers that are not accepted by the target SN during an SN addition associated with the conditional PSCell change.

29. A method for wireless communication at a master node (MN), comprising:
   receiving, from a source secondary node (SN), or from a set of target SNs, information that identifies the set of target SNs;
   receiving a message indicating that a user equipment (UE) has determined that a condition for a conditional primary secondary cell (PSCell) change has been satisfied for a candidate target PSCell,
   the candidate target PSCell being one of a set of candidate target PSCells associated with the UE in a conditional PSCell change configuration; and
   transmitting, to the source SN, a confirmation message associated with the conditional PSCell change.

30. The method of claim 29, wherein the MN and the source SN are nodes in a multi-radio access technology dual connectivity configuration.

* * * * *